US008675082B2

(12) United States Patent
Sato et al.

(10) Patent No.: US 8,675,082 B2
(45) Date of Patent: Mar. 18, 2014

(54) IMAGING DEVICE AND IMAGING DEVICE CONTROL METHOD

(75) Inventors: Takeshi Sato, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 598 days.

(21) Appl. No.: 12/880,977

(22) Filed: Sep. 13, 2010

(65) Prior Publication Data

US 2011/0063118 A1   Mar. 17, 2011

(30) Foreign Application Priority Data

Sep. 16, 2009   (JP) ................................. 2009-214066

(51) Int. Cl.
H04N 5/228 (2006.01)
H04N 5/262 (2006.01)
H04N 5/232 (2006.01)

(52) U.S. Cl.
USPC ................... 348/208.99; 348/240.3; 348/345; 348/222.1

(58) Field of Classification Search
USPC ............. 348/169, 222, 1, 240.3, 345, 208.99, 348/208.1, 208.2; 340/635; 382/190, 118
See application file for complete search history.

(56) References Cited

U.S. PATENT DOCUMENTS

| 8,416,996 | B2 | 4/2013 | Ogawa | |
|---|---|---|---|---|
| 2002/0081114 | A1* | 6/2002 | Aizawa et al. | 396/376 |
| 2004/0119852 | A1* | 6/2004 | Shin | 348/240.2 |
| 2004/0201772 | A1 | 10/2004 | Kobayashi | |
| 2007/0052820 | A1* | 3/2007 | Ikeda | 348/231.99 |
| 2008/0122943 | A1* | 5/2008 | Itoh | 348/222.1 |
| 2008/0159628 | A1* | 7/2008 | Yoshida | 382/190 |
| 2008/0187185 | A1* | 8/2008 | Misawa et al. | 382/118 |
| 2009/0003709 | A1* | 1/2009 | Kaneda et al. | 382/190 |
| 2009/0059008 | A1* | 3/2009 | Ishii | 348/169 |
| 2009/0135269 | A1* | 5/2009 | Nozaki et al. | 348/222.1 |
| 2010/0053418 | A1* | 3/2010 | Irie | 348/345 |
| 2011/0050904 | A1* | 3/2011 | Anderson | 348/157 |

FOREIGN PATENT DOCUMENTS

| JP | 05-110930 | 4/1993 |
|---|---|---|
| JP | 2002-271654 | 9/2002 |
| JP | 2002-271654 A | 9/2002 |
| JP | 2004-207842 | 7/2004 |
| JP | 2004-282463 | 10/2004 |

(Continued)

OTHER PUBLICATIONS

Office Action to counterpart Chinese Application Serial No. 201010288532.1, mailed May 2, 2013 (5 pgs.).

(Continued)

Primary Examiner — Nhan T Tran
Assistant Examiner — Xi Wang
(74) Attorney, Agent, or Firm — John C. Pokotylo; Straub & Pokotylo

(57) ABSTRACT

An imaging device of the present invention comprises a photographing lens for forming a subject image, an imaging section for converting the subject image to image signals and outputting the image signals, a storage section for storing image data obtained based on the image signals output from the storage section, an attitude detection section for detecting an attitude of the imaging device, an image detection section for detecting a face image contained in the image signals, and a storage control section for determining storage start and storage end for the image data, based on detection results of the attitude detection section and detection results of the image detection section.

15 Claims, 18 Drawing Sheets

(56) References Cited

FOREIGN PATENT DOCUMENTS

| | | |
|---|---|---|
| JP | 2005-079814 | 3/2005 |
| JP | 2006-319470 | 11/2006 |
| JP | 2007-329602 | 12/2007 |
| JP | 2008-205846 | 9/2008 |
| JP | 2008-301162 | 12/2008 |
| JP | 2009-033566 | 2/2009 |
| JP | 2009-033566 A | 2/2009 |
| JP | 2009-065577 | 3/2009 |
| JP | 2009-141501 | 6/2009 |

OTHER PUBLICATIONS

Office Action to counterpart Japanese Application No. 2009-214066, mailed Jul. 4, 2013 (4 pgs.).

Office Action to Chinese Application No. 201010288532.1, mailed Nov. 13, 2013 (5 pgs).

* cited by examiner

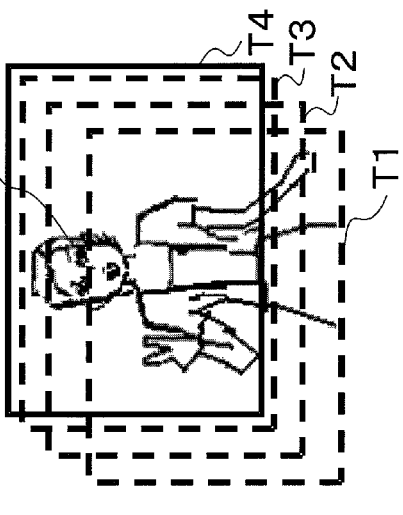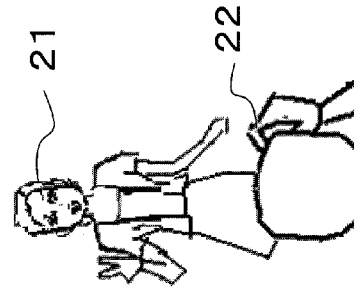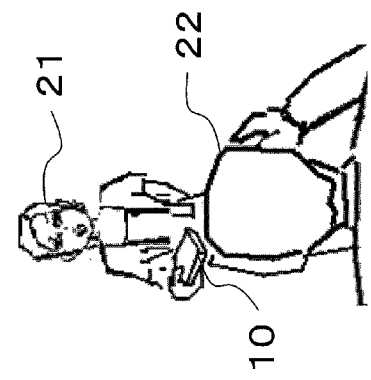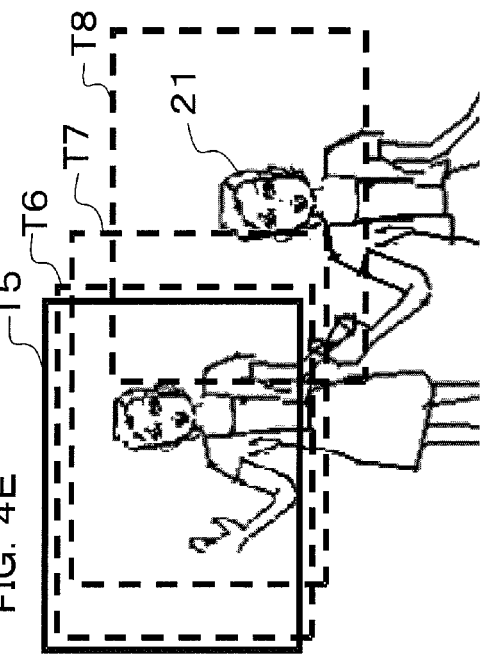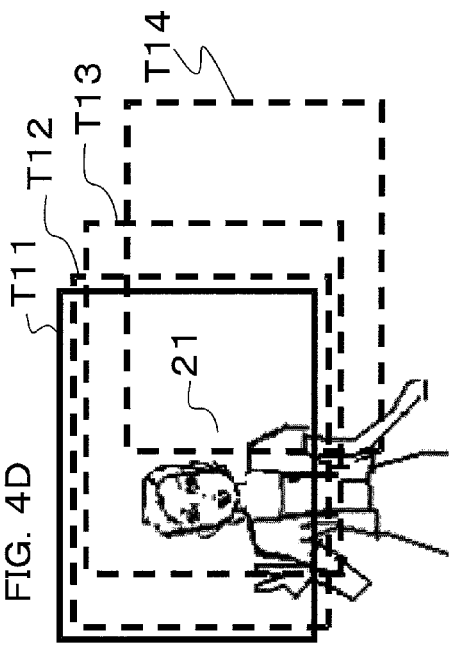

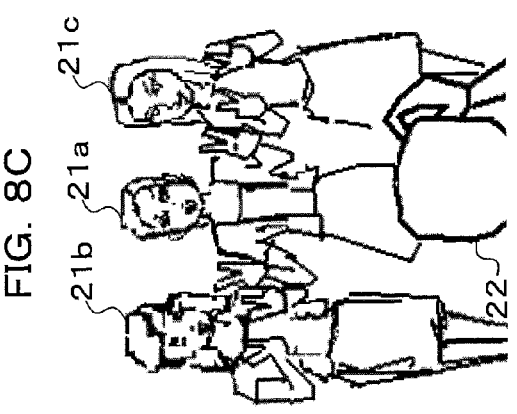
FIG. 8C  FIG. 8B  FIG. 8A
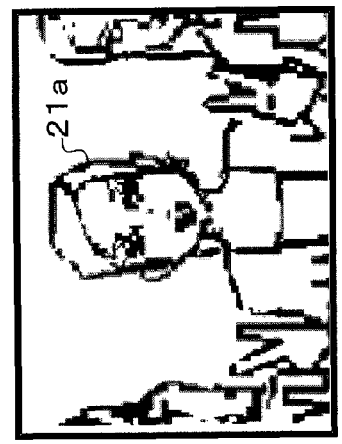
FIG. 8F
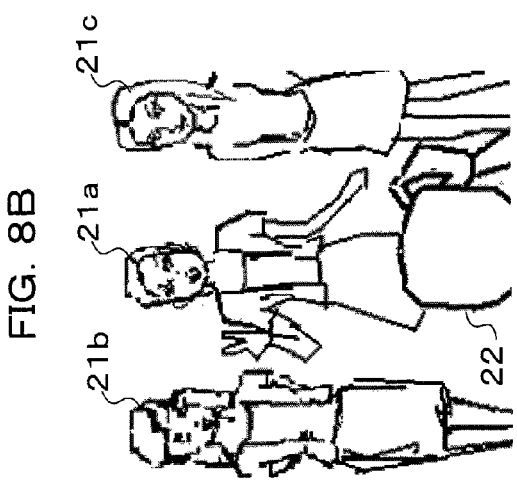
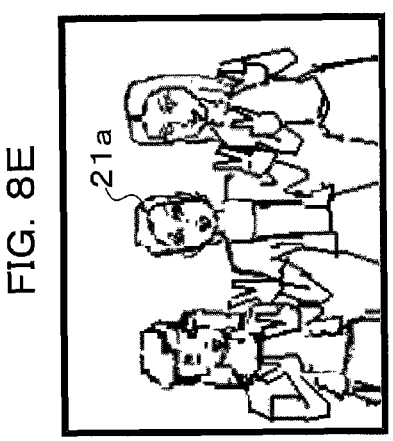
FIG. 8E
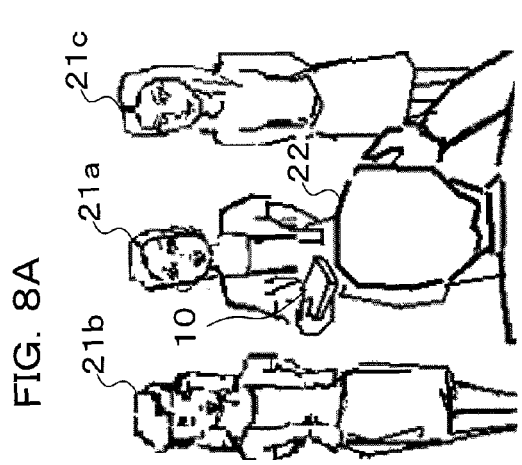
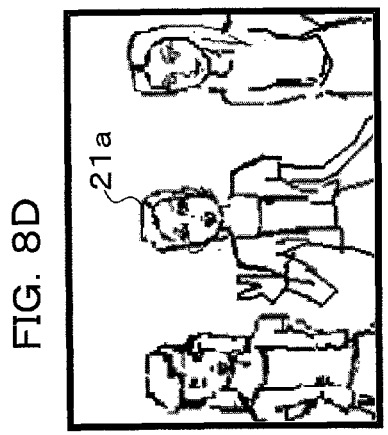
FIG. 8D

BEEP BEEP

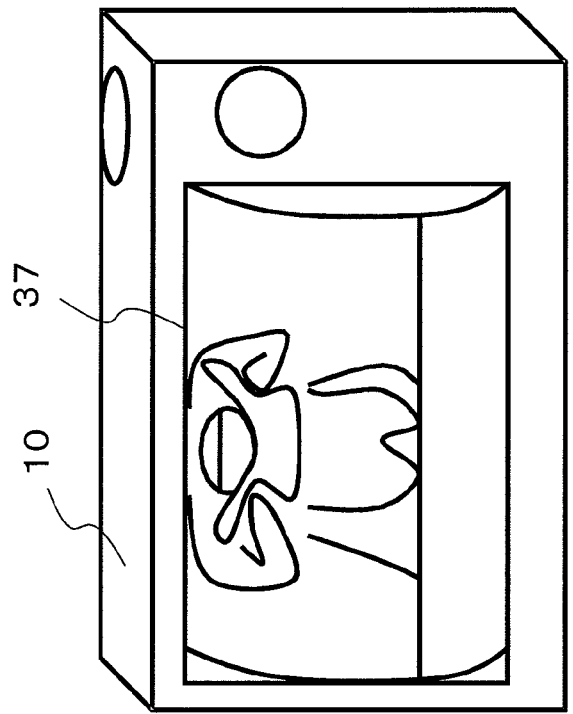
FIG. 16A DISPLAY
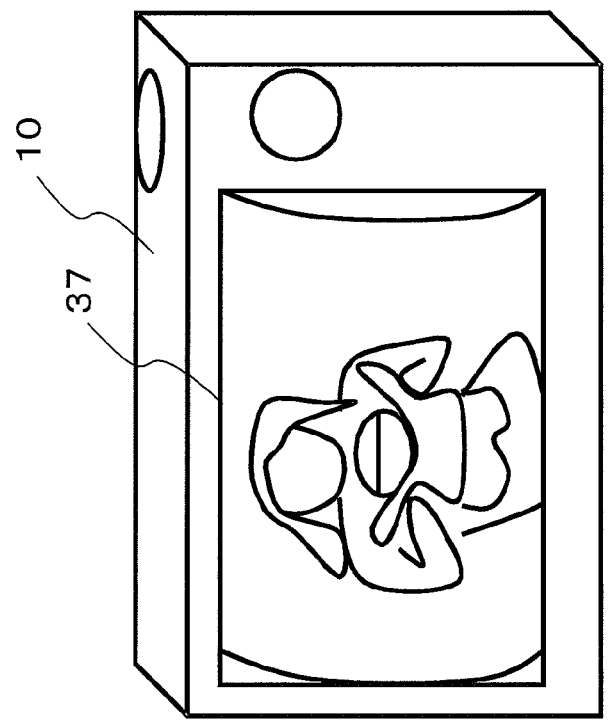
FIG. 16B DISPLAY SHIFT

FIG. 18A CYLINDRICAL DISPLAY
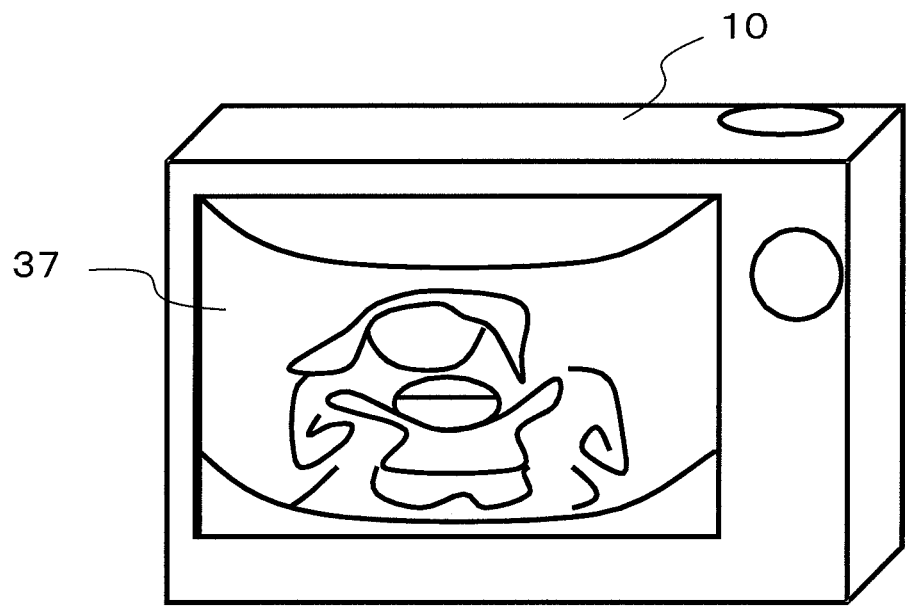
FIG. 18B DISPLAY SHIFT
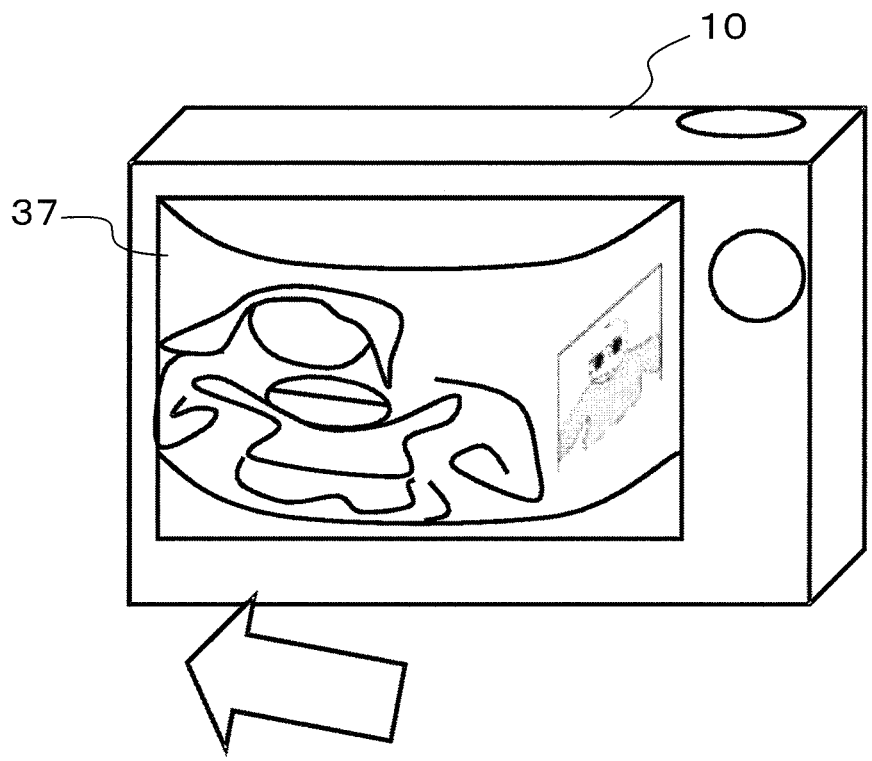

IMAGING DEVICE AND IMAGING DEVICE CONTROL METHOD

Benefit is claimed, under 35 U.S.C. §119, to the filing date of prior Japanese Patent Application No. 2009-214066 filed on Sep. 16, 2009. This application is expressly incorporated herein by reference. The scope of the present invention is not limited to any requirements of the specific embodiments described in the application.

BACKGROUND OF THE INVENTION

1. Field of the Invention

The present invention relates to an imaging device and a control method for an imaging device, and in more detail relates to an imaging device having a movie shooting function, such as a digital camera, video camera, or mobile phone with camera, and a control method for such an imaging device.

2. Description of the Related Art

Conventionally, if it was said that a picture was taken by an amateur, it was generally assumed to be a printed still photograph. However, in recent years it has become possible to more easily take even movies obtained by continuously shooting still images, by changing from a film camera to an imaging device such as a digital camera having an image sensor and a memory. With movie shooting it is possible to record interesting and expressive pose changes that would have been difficult with still picture shooting, and this movie shooting is used in recording children growing up, changes in scenery at a travel destination etc.

However, differing from still pictures that only capture a scene in a split second, movies are for recording movement, and since a shot movie will be dull and uninteresting unless the time from start to the end of movement is appropriately chosen, a lot of stress is placed on the photographer. There are therefore a lot of photographers who are reluctant to shoot movies. For example, in the case asking a person who is nearby to take a photograph, although it is easy to ask them to simply press the shutter button, as it is a still picture, if it is a movie it is quite understandable that the person who has been asked to take the picture will not know when is the best time to take the picture. From the viewpoint of shooting timing, Japanese patent laid-open No. 2007-329602 (laid-open Dec. 20, 2007) discloses an imaging device that, at the time of taking a group photo or the like, can perform shooting once a specified number of faces has been reached.

SUMMARY OF THE INVENTION

The present invention has as its object to provide an imaging device and an imaging device control method that can shoot movies in a casual manner without worrying about shooting start timing.

An imaging device of the present invention comprises: a photographing lens for forming a subject image, an imaging section for converting the subject image to image signals and outputting the image signals, a storage section for storing image data obtained on the basis of the image signals output from the imaging section, an attitude detection section for detecting attitude of the imaging device, an image detection section for detecting face images contained in the image signals, and a storage control section for determining storage start and storage finish for image data based on detection results from the attitude detection section and detection results from the image detection section.

Also, an imaging device of the present invention comprises: a photographing zoom lens, an imaging section for converting a subject image formed by the zoom lens to image signals and outputting the image signals, a storage section for storing image data on the basis of the image signals output from the imaging section, an attitude detection section for detecting attitude of the imaging device, an image detection section for detecting face images contained in the image signals, a storage control section for controlling storage of image data based on detection results from the attitude detection section and detection results from the image detection section, and an angle of view control section for controlling angle of view of the zoom lens to a wide angle end, before detection of the face images.

Also, an imaging device of the present invention comprises: a photographing lens for forming a subject image, an imaging section for converting a subject image formed by the photographing lens to image signals, a storage section for storing image data based on the image signals, a display section provided on an exterior surface different to that of the photographing lens, and a storage control section for carrying out display to suggest a change in attitude of the imaging device, on the display section, and also detecting face images contained in the image signals to control start of storing the image data.

A control method for an imaging device of the present invention comprises: converting a subject image formed by a photographing lens into image signals, detecting an attitude of the imaging device and detecting face images contained in the image signals, determining start and end of storage of the image data based on the results of attitude detection and the results of face image detection, and storing the obtained image data based on image signal during the determined period.

BRIEF DESCRIPTION OF THE DRAWINGS

FIG. 4A to FIG. 4E are drawings showing a usage method for the camera of the first embodiment of the present invention, and show appearance of asking a person nearby to take a photograph.

FIG. 8A to FIG. 8F are drawings showing a usage method for the camera of a second embodiment of the present invention, and show appearance of asking a person nearby to take a photograph.

FIG. 16A and FIG. 16B are drawings showing another example of display for getting a child interested and then taking a picture, with a modified example of the camera of the third embodiment of the present invention.

FIG. 18A and FIG. 18B are drawings showing another example of display for getting a child interested and then taking a picture, with a modified example of the camera of the third embodiment of the present invention.

DETAILED DESCRIPTION OF THE PREFERRED EMBODIMENTS

Preferred embodiments using a digital camera to which the present invention has been applied will be described in the following in accordance with the drawings. A camera of a preferred embodiment of the present invention has general digital camera functions. Specifically, the camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation, image data of a still picture or movie is stored in a storage medium, and at this time information such as the shooting time and the shooting mode are additionally stored. Also, a taken image stored in the storage medium can be played back on the display section if playback mode is selected.

Figure 1:
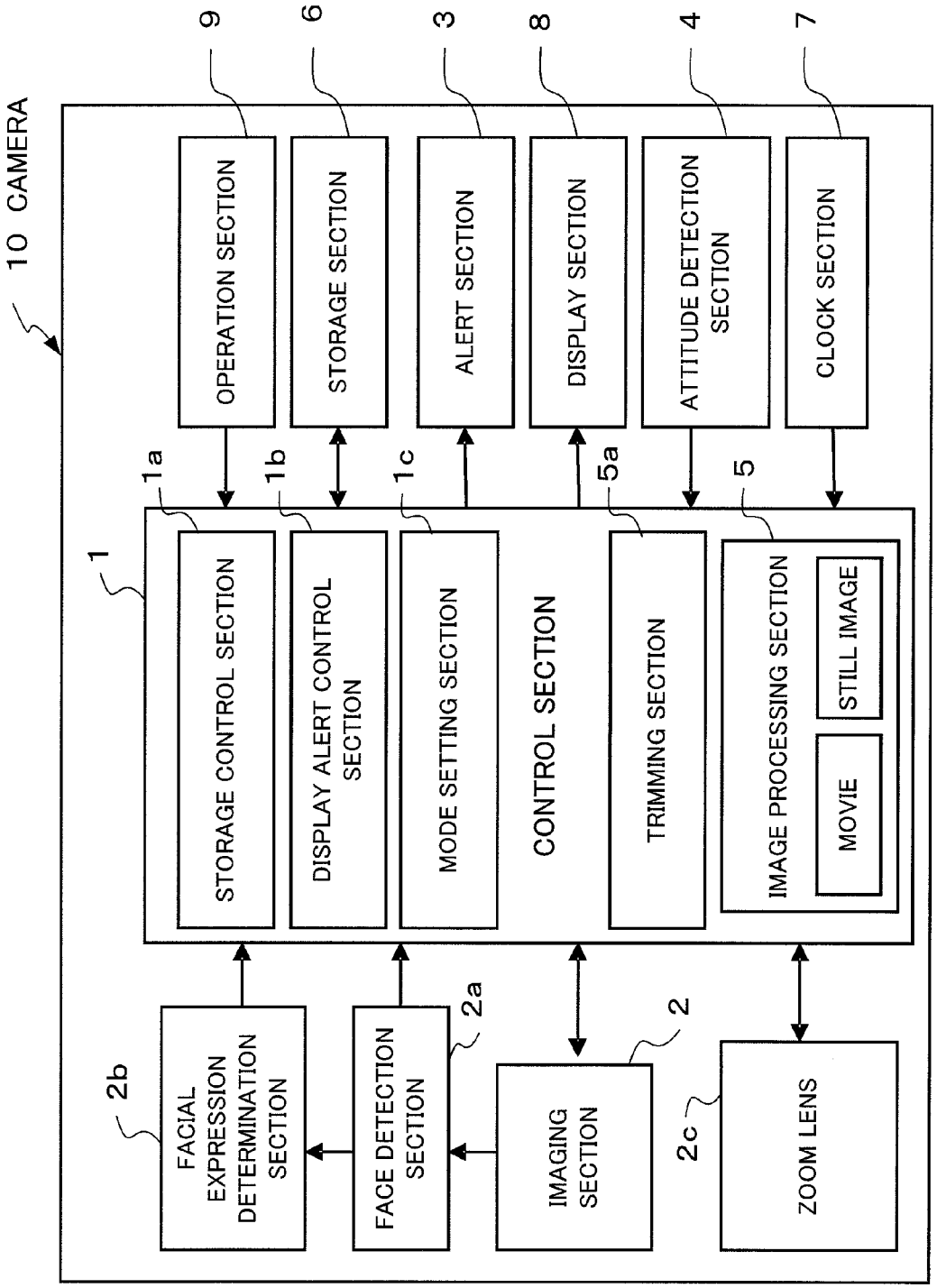
FIG. 1 is a block diagram showing the electrical structure of a camera relating to a first embodiment of the present invention.

FIG. 1 is a block diagram showing electrical circuits of a camera 10 of a first embodiment of the present invention. The camera 10 is a digital camera, and comprises a control section 1, imaging section 2, face detection section 2a, expression determination section 2b, zoom lens 2c, alert section 3, attitude determination section 4, storage section 6, clock section 7, display section 8, and operation section 9 etc.

The zoom lens 2c is a photographing lens with a variable focal length, and inside the zoom lens 2c there are exposure control sections such as a shutter and an aperture, and an electrical focusing mechanism for the photographing lens. Automatic focus adjustment is carried out by the focusing mechanism, based on control signals from the control section 1 that will be described later. The imaging section 2 includes an image sensor, and image sensor drive and readout circuits, etc., and converts a subject image that has been formed by the zoom lens 2c into image signals using the image sensor, and outputs these image signals.

The face detection section 2a is input with image signals output from the imaging section 2, detects whether or not a human face is included within the subject image, and if there is a face detects the position and size of the face, and outputs detection results to the control section 1 and to the expression determination section 2b. Detecting a face is carried out by extracting shading of parts such as the eyes, nose and mouth within the face, and subjecting them to pattern matching etc. It is possible to carry out focusing of the zoom lens 2c based on a face detected by the face detection section 2a.

The expression determination section 2b is input with image signals from the imaging section 2, and for a face that has been detected by the face detection section 2a carries out determination of the expression of that person, such as whether or not they are smiling. The determination is carried out based on the shape of parts of the face, such as the eyes and mouth.

The control section 1 controls all processing sequences of the camera 10 in accordance with a program stored in a storage section, not shown. Each of the sections inside the control section 1 is executed by hardware within the control section or by software using programs. The control section 1 has a storage control section 1a, a display alert control section 1b, a mode determination section 1c, an image processing section 5 and a trimming section 5a.

The storage control section 1a carries out control when storing image data for still images or movies, that have been subjected to image processing by the image processing section 5, in the storage section 6, based on image signals output from the imaging section 2. The display alert control section 1b carries out control when performing display, such that it is possible to confirm that a person to be pictured in a photograph etc. is actually in the photograph, in the alert section 3.

The mode determination section 1c carries out mode setting, such as program shooting mode, scenery shooting mode, requested shooting mode etc. Here, "requested shooting mode" is a convenient mode when asking a person who is nearby to take a picture with the camera 10, in which movement (attitude) of the camera 10 and a face of a subject are detected, and taking of a move is commenced once an appropriate state is reached, based on these detection results.

The image processing section 5 has a processing section for movies and a processing section for still images, acquires image signals respectively output from the imaging section 2 to perform various processing such as thinning processing, resizing processing, edge enhancement, color correction, image compression etc., and carries out image processing such as for live view display of movies, storage of still images and movies in the storage section 6, and playback display of still images and movies. For image compression and expansion there are circuits for still images and for movies handling the respective processing, such as a compression and expansion circuit for still images and a compression and expansion circuit for movies.

The trimming section 5a carries out trimming processing to crop part of the image signals output from the imaging section 2. Clipping of image data is carried out by clipping an image of a specified portion, such as the center of an image, but besides this the area around a face of a subject is clipped based on the position and size of a face detected by the face detection section 2a. This trimmed image is displayed on the display section 8, and stored in the storage section 6.

The attitude determination section 4 has a 6-axis sensor, etc., and detects an attitude (inclination) state of the camera 10. Detection of attitude uses acceleration sensors, inclination sensors, sensors for detecting hand shake, etc. The sensor sections of this attitude determination section 4 will be described later using FIG. 2.

The display section 8 is arranged on the rear surface of the camera 10, and is comprised of a display device such as a liquid crystal monitor or organic EL. The display section 8 also performs live view display of a subject as a movie based on image data from the imaging section 2, and playback display of taken images stored in the storage section 6. The alert section 3 has display elements such as LEDs, and displays an indication of the fact that shooting is in progress.

The operation section 9 includes operation members such as a release button, zoom button, playback button and menu button provided on the camera 10, and determines operating states of the operation members for output to the control section 1. The control section 1 performs control of the camera based on operation states of the operation members. The previously described requested shooting mode is set in a menu mode of the operation section 9.

The clock section 7 has a clock function, and outputs date and time information. The storage section 6 is storage medium for storing image data. If the control section 1 determines that an operation for a shooting instruction has been carried out using the operation section 9, image data and shooting date and time information correlated to that image data is stored in the storage section 6. This is in order to enable image management based on shooting time and date.

Figure 2A:
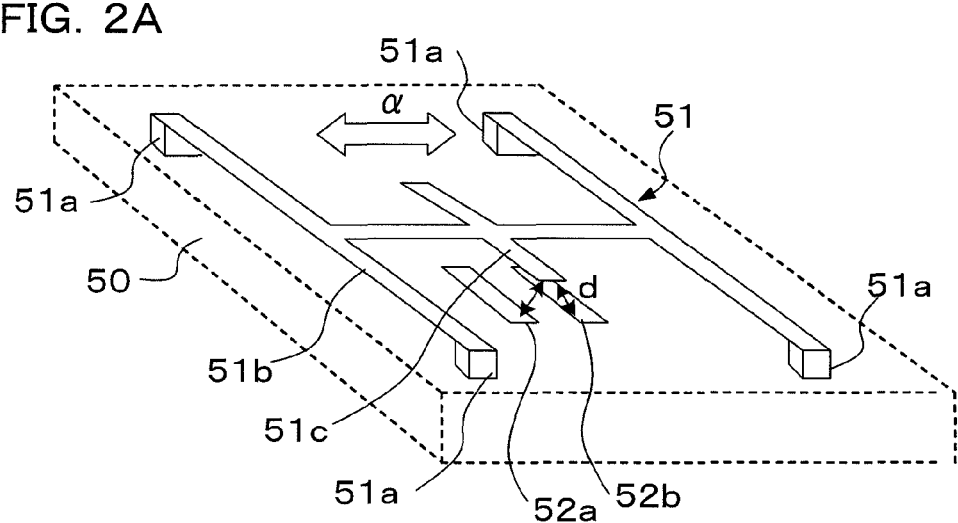
FIG. 2A and FIG. 2B show the structure of an attitude determination section of the camera of the first embodiment of the present invention, with FIG. 2A being a perspective drawing showing the structure of an acceleration sensor, and FIG. 2B being an exploded perspective drawing showing arrangement of acceleration sensors inside the camera, and the detection directions of the acceleration sensors.

Next the acceleration sensors 50 arranged inside the attitude determination section 4 will be described using FIG. 2A and FIG. 2B. As shown in FIG. 2A, an acceleration sensor 50 comprises fixed metallic portions on the chip surface 52a, 52b, and a metallic portion 51 that is suspended, and is constructed using, for example, a MEMS process or the like. The metallic portion 51 is made up of four datum points 51a, a bridging section 51b that has an H shape supported by the four datum points 51a, and a movable section 51c that diagonally faces the fixed metallic portions 52a and 52b. The acceleration sensor 50 detects capacitance of a capacitor formed by the movable section 51c and the fixed metallic portions 52a, 52b. If the metallic portion 51 moves in the direction of the arrows in FIG. 2A, the capacitance of the capacitor varies, and so by obtaining an amount of change in the capacitance it is possible to detect an acceleration α in the direction of the arrows.

Figure 3:
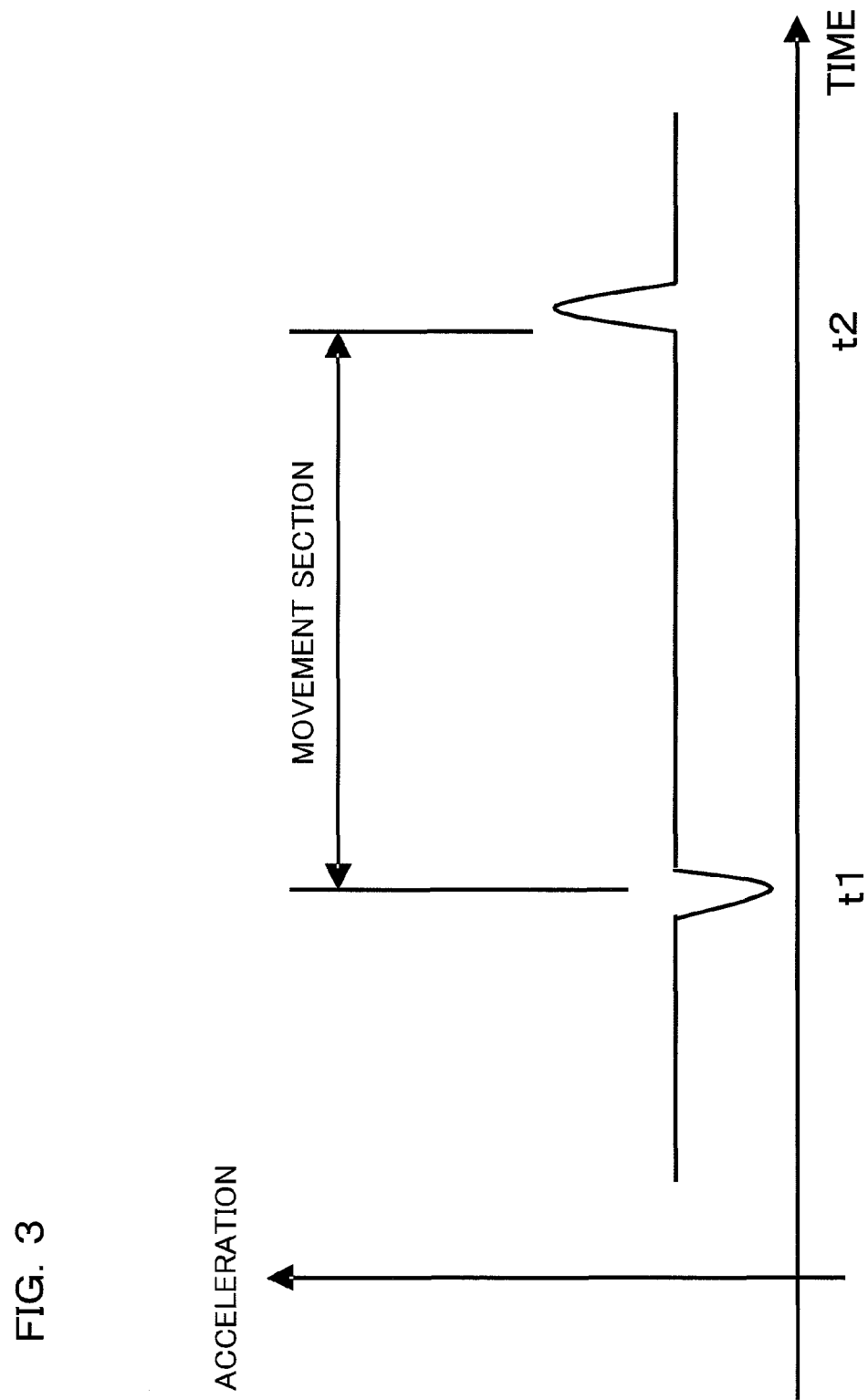
FIG. 3 is a graph showing signal outputs of an acceleration sensor of the attitude determination section, in the camera of the first embodiment of the present invention.

FIG. 3 shows detection output of the acceleration sensor 50, and with the example of FIG. 3 the camera 10 is moving at a constant speed, and at a movement start time t1 the detection output of the acceleration sensor 50 becomes smaller than a steady state value, while at the movement end time t2 becomes larger than the steady state value. Depending on the movement direction, the detection output will change to the opposite direction to that of the example shown in FIG. 3. Therefore, the direction of the acceleration α can also be known from detection of signal changes. Displacement d between the fixed metallic portions 52a and 52b and the movable section 51c is also calculated from the variation in capacitance of the capacitor formed by the fixed metallic portions 52a and 52b and the movable section 51c, and acceleration d is calculated from time variation of this displacement d.

Also, depending on the attitude (inclination) of the camera 10, a positional relationship between the suspended metallic portion 51 and the fixed metallic portions 52a and 52b on the chip surface varies with the effects of gravity, and detection output varies. It is therefore also possible to determine whether the camera 10 is oriented horizontally or vertically depending on the detection results of the acceleration sensor 50

Figure 2B:
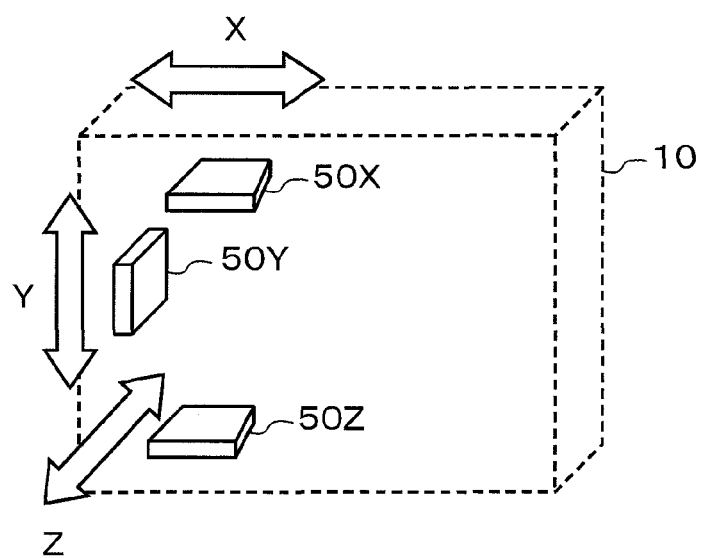

As shown in FIG. 2B, there are three of the previously described acceleration sensors 50 arranged inside the camera 10. Specifically, an acceleration sensor 50X for detecting acceleration in the longitudinal direction (X direction) of the camera 10, an acceleration sensor 50Y for detection acceleration orthogonal to the longitudinal direction of the camera 10 (Y direction), and an acceleration sensor 50Z for detecting acceleration in an optical axis direction (Z direction), at the left side of the camera 10, are disposed, and detect acceleration in the respective directions.

Since the acceleration sensors 50X, 50Y and 50Z are arranged in this way, the respective acceleration sensors 50X, 50Y and 50Z vary depending on change in attitude of the camera 10, and if the camera 10 is moved it is possible to determine in which direction the camera is moving based on acceleration signals for the movement start time t1 and the movement end time t2.

Next shooting in the "requested shooting mode" in this embodiment will be described using FIG. 4A to FIG. 4E. In the event of requesting a picture to be taken, such as the person owning the camera 10 asking a person 22 who is nearby to take a picture after having set the "requested shooting mode" in advance (refer to FIG. 4A), the person 22 who has been asked to take the pictures holds the camera 10 (refer to FIG. 4B) and once a stable state has been reached a movie is automatically shot. In this case, as little notification as possible is given of the fact that the movie is automatically taken, and generally the person 22 being asked to shoot will think they have been asked to take a still picture, take the camera 10, operate the release button once an appropriate composition has been achieved, and then return the camera 10 to the person 21 who requested the shot to be taken upon taking a still image. The requested shooting mode assumes this type of action.

FIG. 4C shows a subject image when the person 22 who was requested to do the shooting is pointing the camera 10 toward the person 21 who requested the shooting, and T1 to T4 show compositions at time T1 to time T4. From time T1 to time T3, the person requested to do the shooting is holding the camera 10 and carrying out framing, and so composition is not stable. Once time T4 is reached from time T3, camera movement becomes small, and composition becomes stable, and so shooting of the movie commences at this time.

After shooting of the movie has started, if still picture shooting is carried out by operation of the release button etc. then the person 22 asked to do the shooting will again move the camera in order to return the camera 10 to the person 21 who requested the shooting. Camera movement at this time is as shown in FIG. 4D, where movement is small from time T11 to T12 where the camera is being held, and camera movement is large and composition unstable from time T12 to time T14. Shooting of the movie is therefore finished at the time the movement becomes large.

However, in the event that camera 10 is additionally moved when the person 21 making the request, who is the subject, moves, movie shooting should continue even if camera movement becomes large. Specifically, as shown in FIG. 4E, in the case where the person 21 requesting the shooting turns from the left side to the right side, and moves in the period from time T5 to time T8, composition is unstable but the person 21 requesting shooting is always within the subject image, and so in this case movie shooting continues.

Next, operation in the case of requested shooting mode that was described in FIG. 4A to FIG. 4E will be described using the flowchart shown in FIG. 5. This processing flow is executed by the control section 1 on the basis of a prestored program.

If the processing flow for camera control is entered, it is first determined whether or not the requested shooting mode has been set (S1). As previously described, in the case where a person who is nearby has been requested to carry out shooting (refer to FIG. 4A and FIG. 4B), the user will have set the requested shooting mode. The requested shooting mode is set as one shooting mode on the menu screen, and so in this step the shooting mode that has been set is determined.

If the result of determination in step S1 is that requested shooting mode has not been set, a mode other than requested shooting mode, for example normal shooting mode or playback mode, is next executed, and once that is completed processing returns to step S1.

If the result of determination in step S1 is that requested shooting mode has been set, the zoom is next set to wide angle, and an imaging operation, and display and face determination, are carried out (S2). In this step, the focal length of the zoom lens 2c is driven to the wide angle end, and an imaging operation by the imaging section 2 is commenced. By setting the zoom lens 2c to wide angle, the probability of the person requesting the shooting 21, who is the subject, being within the screen is increased. Then, live view display on the display section 8 is commenced based on image signals output from the imaging section 2, and the photographer performs framing by looking at the display. The face detection section 2a also commences face determination based on image signals, and performs determination as to whether or not the face of a person exists within the taken image, and if so, the location and size of the face.

Next it is determined whether or not a release operation has been carried out (S11). In this step it is determined whether or not the release button of the operation section 9 has been operated. If the result of this determination is that there has not been a release operation, it is next determined whether or not a movie is being stored (S21). Commencement of movie storage is carried out in step S27, which will be described later, and so in this step it is determined whether or not movie storage has already started and the movie is being stored.

If the result of determination in step S21 is that a movie is not being stored, it is next determined whether or not a face has been detected (S22). In step S2 face determination by the face detection section 2a is commenced, and in this step S22 it is determined whether or not a face is included in the subject image that changes from one moment to the next. If the result of this determination is that a face has not been detected, processing returns to step S11.

On the other hand, if the result of determination in step S22 is that a face has been detected, the position of this face is stored (S23). Here the position of a face detected by the face detection section 2a is stored in a temporary storage area inside the control section 1.

It is next determined whether or not the camera has been moved (S24). Since acceleration etc. applied to the camera 10 is being detected by the attitude determination section 4, whether or not the camera has moved is determined based on detection results from the attitude determination section 4.

If the result of determination in step S24 is that the camera was not moved, it is next determined whether or not there has been no movement for five seconds (S25). As was described in FIG. 4C, if movement of the camera 10 is stable (from time T3 to T4) shooting of a movie commences, and so in this step it is determined whether or not the state of the camera 10 is stable. It is determined that there has been no movement for 5 seconds, but it is also possible to determine whether or not the state of the camera 10 is stable, and so it is not limited to 5 seconds and can a shorter time or a longer time than this. If the result of determination in step S25 is that 5 seconds have not elapsed with there being no movement, step S11 is returned to. This is because the state of the camera 10 is not stable.

If the result of determination in step S24 is that there was camera movement, it is next determined whether or not variation in face position is small (S26). As described previously, in the event that the subject is moving, there will be cases where the shooting direction of the camera 10 moves together with the subject (refer to FIG. 4E), and this case is a situation where movie shooting should be carried out. In this step S26, it is determined whether an amount of variation in position of a face detected by the face detection section 2a is smaller than an extent at which it can be said that a subject is being tracked.

If the result of determination in step S26 is that variation in face position of the subject is small, or the result of determination in step S25 is that the camera 10 has not moved for 5 seconds, storage of the movie is commenced and the fact that shooting is in progress is displayed (S27). Here, image signals output from the imaging section 2 are subjected to image processing by the image processing section 5, and image data of the movie output here is stored in the storage section 6. When this step is entered after storage of the movie has commenced, storage of the movie is continued. Once step S27 is executed, if the result of determination in step S26 is that variation in face position is not small, processing returns to step S11.

If the result of determination in step S11 is that there has been a release operation, namely that the release button has been pressed, storage of a representative still image is carried out (S12). Here, image signals output from the imaging section 2 are subjected to image processing by the still image processing section of the image processing section 5, and image data of the still image output here is stored in the storage section 6.

Update of the face position is then carried out (S13). In this step, the position of a face detected by the face detection section 2a is updated. Once update of face position is carried out, storage of the movie is started again (S14). Generally, before carrying out a release operation the camera 10 will be pointed towards the subject and in a stable state, and so storage of the movie is started when the camera is made stable. If the result of determination in step S11 becomes Yes during the movie storage, and shooting of the representative still image is entered in step S12, storage of the movie is temporarily halted. Then, once storage of the representative still image is complete storage of the movie starts again in step S14. Once movie storage is recommenced, processing returns to step S11.

If the result of determination in step S21 is that movie storage is in progress, it is next determined whether or not variation in face position is large (S31). Here, whether there is large variation in the face position is determined based on detection results from the face detection section 2a. If the result of this determination is that there is no variation in face position, processing returns to step S11.

On the other hand, if the result of determination in step S31 is that there is large variation in the face position, it is next determined whether or not the camera 10 is fixed (S32). Here it is determined by the attitude determination section 4 whether or not the camera 10 is being held firmly.

If the result of determination in step S32 is that the camera 10 is steady, it is next determined whether or not a face moves off the screen (S33). Here, position of the face is detected by the face detection section 2a, and it is determined whether the position of the face moves off the screen.

If the result of determination in step S33 is that the face is not outside of the screen, processing returns to step S11. This situation arises when the position of the face of the subject moves with the camera 10 in a steady state, but the position of the face is still inside the screen. This situation is generally either a situation where the shooting position of the subject has been decided before still picture shooting, or a situation where the subject has moved away after still image shooting, but the photographer is still holding the camera 10.

If the result of determination in step S33 is that the face has moved off the screen, or if the result of determination in step S32 is that the camera 10 is not steady, storage of the movie is next finished, and shooting in progress display is finished (S34). When it is determined in step 32 that the camera 10 is not steady, position of the face of the subject varies a lot, and the camera 10 is also moving, which means that generally speaking it will be a situation where the person 20 who has been requested to do the shooting is returning the camera 10 to the person who requested the shooting after taking a still image, and so storage of the movie is completed. Also, in the case where the face has moved off the screen in step S33, the person 21 requesting the shooting, who is the subject, has moved off the screen, with the camera 10 steady, and so storage of the movie is completed.

Once storage of the movie is completed, it is determined whether or not there is a movie lasting one second or longer (S35). It is determined whether the time from when the storage of the movie commences in step S27 to when the storage of the movie is completed in step S34 is one second or more. This time is a specified time for preventing storage of a movie in a short time with fragmentary frames, and so it is not limited to one second, and can be set shorter or longer as appropriate, as long as the movie can be enjoyed.

If the result of determination in step S35 is that the movie time is less than one second, that movie is deleted (S37). On the other hand, if the result of determination is that the movie time is one second or longer the movie is stored (S36). In the event that movie storage from the time storage is commenced in step S27 to when storage is completed in step S34 was temporary storage, actual storage to the storage section 6 is carried out, and when storage at that time was storage to the storage section 6, nothing else needs to be done and that stored data is kept. Once step S36 or S37 has been processed, the original processing flow is returned to.

Figure 6:
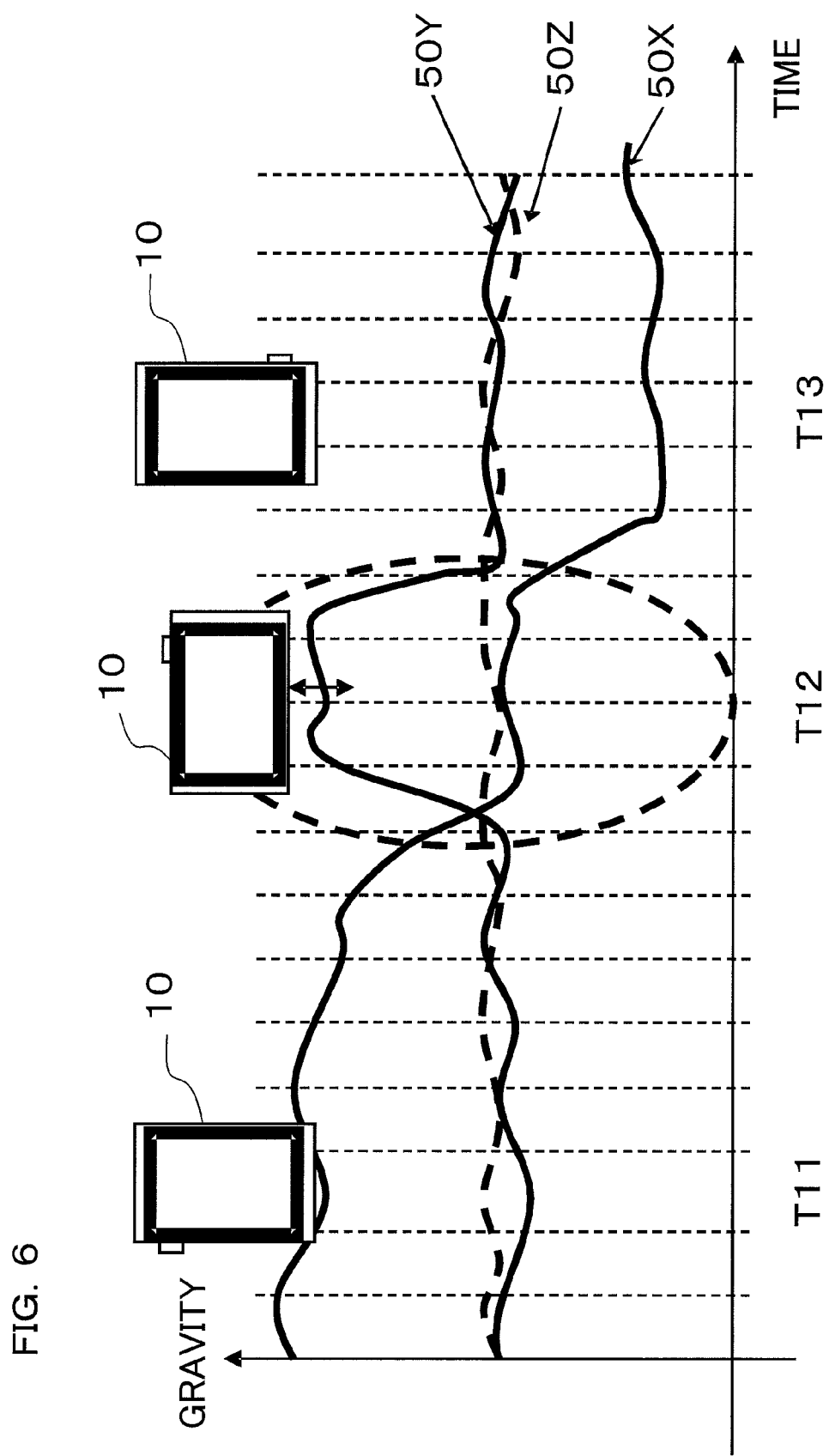
FIG. 6 is a graph showing output values of the attitude detection section in the camera of the first embodiment of the present invention, in a state where a camera is being held and a state where the camera is not being held.
Figure 7A:
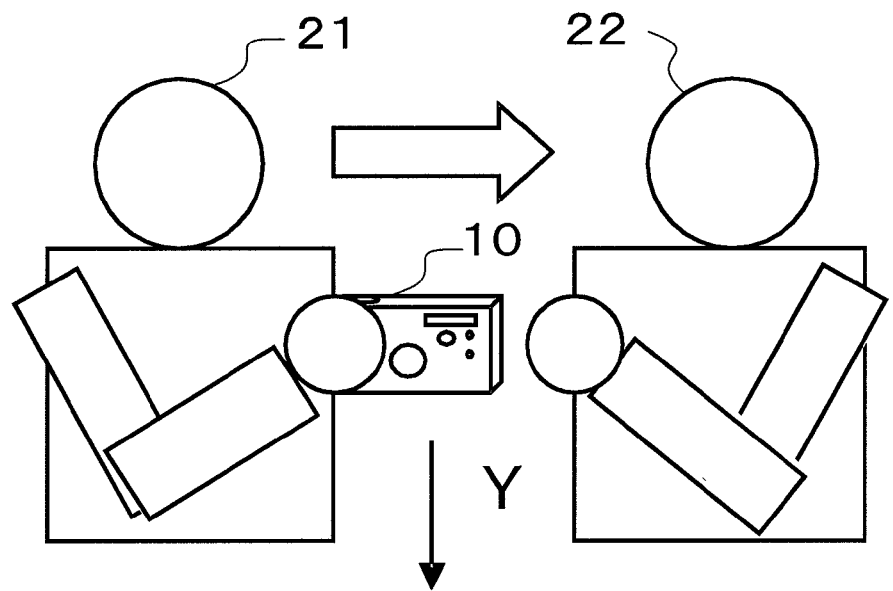
FIG. 7A and FIG. 7B show detection by the attitude detection section in the camera of the first embodiment of the present invention when a camera is handed over, with FIG. 7A showing appearance when the camera is handed over with the camera upright, and FIG. 7B showing the camera being handed over face down.
Figure 7B:
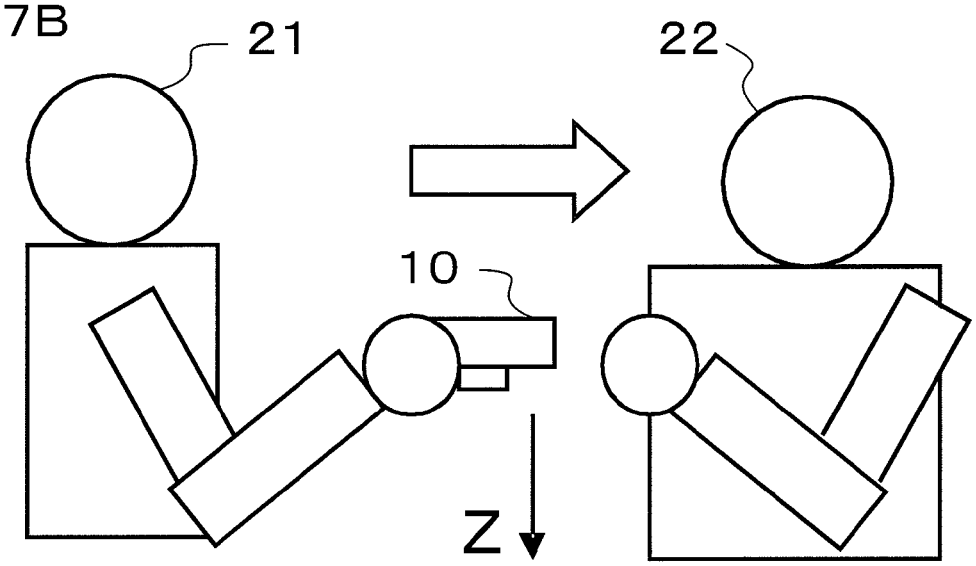

Next, a detection method in the case where, in requested shooting mode, a person requesting shooting 21 has handed over the camera 10 to the person 22 asked to do the shooting, will be described using FIG. 6, and FIG. 7A and FIG. 7B. FIG. 6 shows change over time of detection output of the accelerations sensors 50X, 50Y and 50Z inside the attitude determination section 4. The detection outputs change from time T11 where the camera 10 is not being held, through time T12 where the camera 10 is held, to time T13 where it is not held.

From a state where the camera is not being held, once arriving at time T12 where the camera 10 is held detection outputs of the X direction and Z direction acceleration sensors 50X and 50Z hardly change, but the Y direction acceleration sensor 50Y outputs a signal indicating a swing at a specified amplitude and a specified frequency. When holding the camera 10, this type of signal is output due to the effect of hand shake if the camera 10 is held in a portrait orientation.

As shown in FIG. 6, it is possible to determine that the camera 10 has been handed over by determining the detection outputs of the acceleration sensors 50X, 50Y and 50Z. However, variations in the detection signals will differ depending on how the camera is handed over. For example, as shown in FIG. 7A, when the camera 10 is handed over by sliding with the camera kept in the same lateral orientation, there is not a very large variation of the acceleration sensor 50Y, while variation of the acceleration sensor 50X is large. Also, as shown in FIG. 7B, if the camera 10 is handed over with the camera 10 kept facing downwards, variation of the acceleration sensor 50 becomes large. Accordingly, it is preferable to carry out the determination taking into consideration the various handing over scenarios. In any of the situations, there is movement of the camera in the X direction, and after that it is possible to determine that the handover and the movement of the handover are completed according to whether the vertical direction (Y direction) has become stable.

Figure 5:
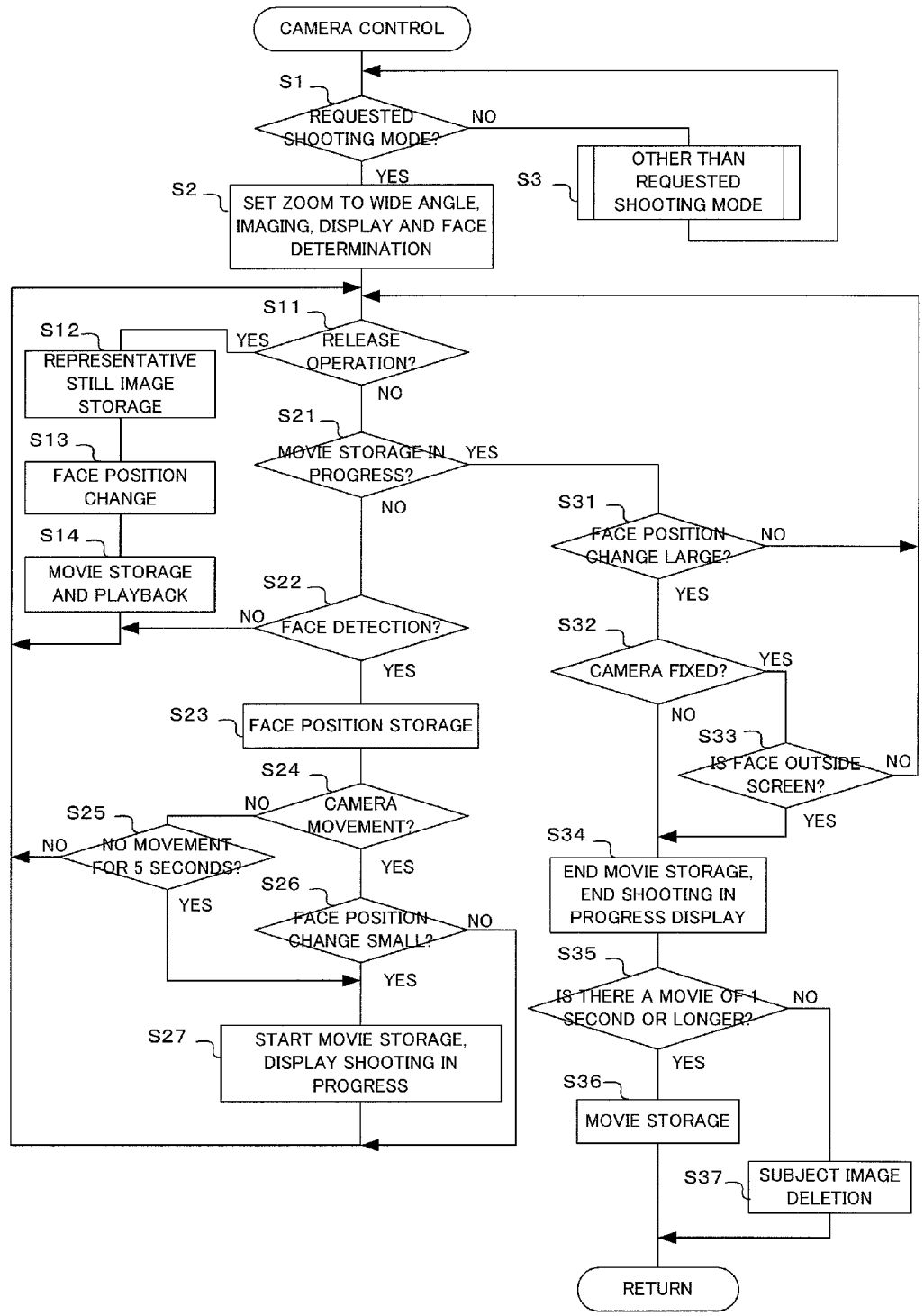
FIG. 5 is a flowchart showing camera control operation for the camera of the first embodiment of the present invention.

In the flowchart shown in FIG. 5, determining detection outputs of the acceleration sensors 50X, 50Y and 50Z to determine handover from the person requesting shooting 21 to the person requested to do the shooting 22 was not explicitly stated. However, in step S1, if requested shooting mode is set, then before determination of whether the camera is steady in step S32 it is preferable to determine the detection outputs of the acceleration sensors 50Y 50X and 50Z, and if the camera is handed over, to determine that the handing over movement is completed.

As described above, in the first embodiment of the present invention, if it is determined that the camera 10 is in a stable state and the face position is not changing, based on attitude determination by the attitude determination section 4 of the camera 10 and face position variation by the face detection section 2a, a movie is shot. It is therefore possible for a person 22 who has been asked to carry out shooting to shoot a movie in a casual manner without worrying about when to start shooting, simply by holding the camera 10.

Figure 9:
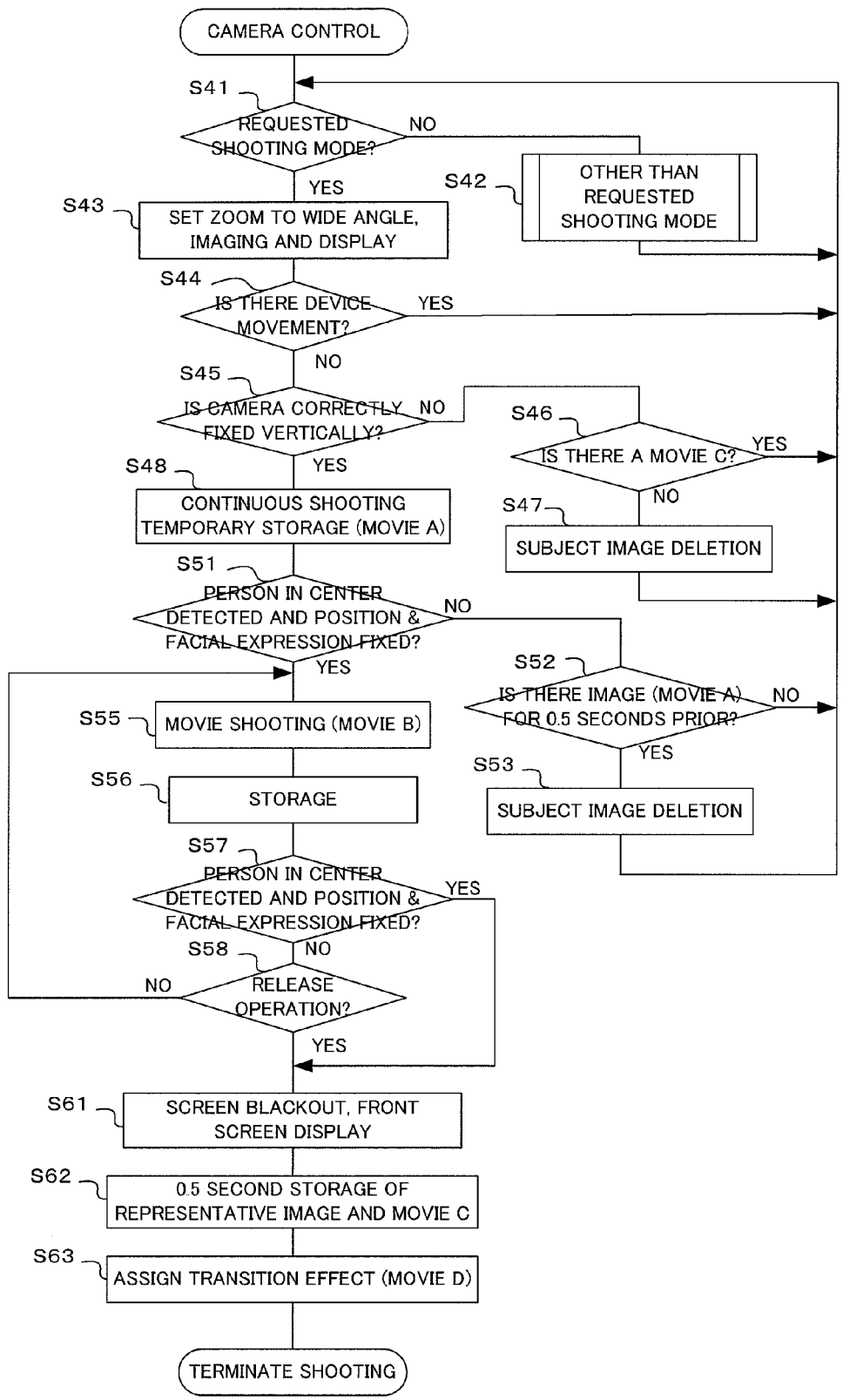
FIG. 9 is a flowchart showing camera control operations for the camera of the second embodiment of the present invention.
Figure 10:
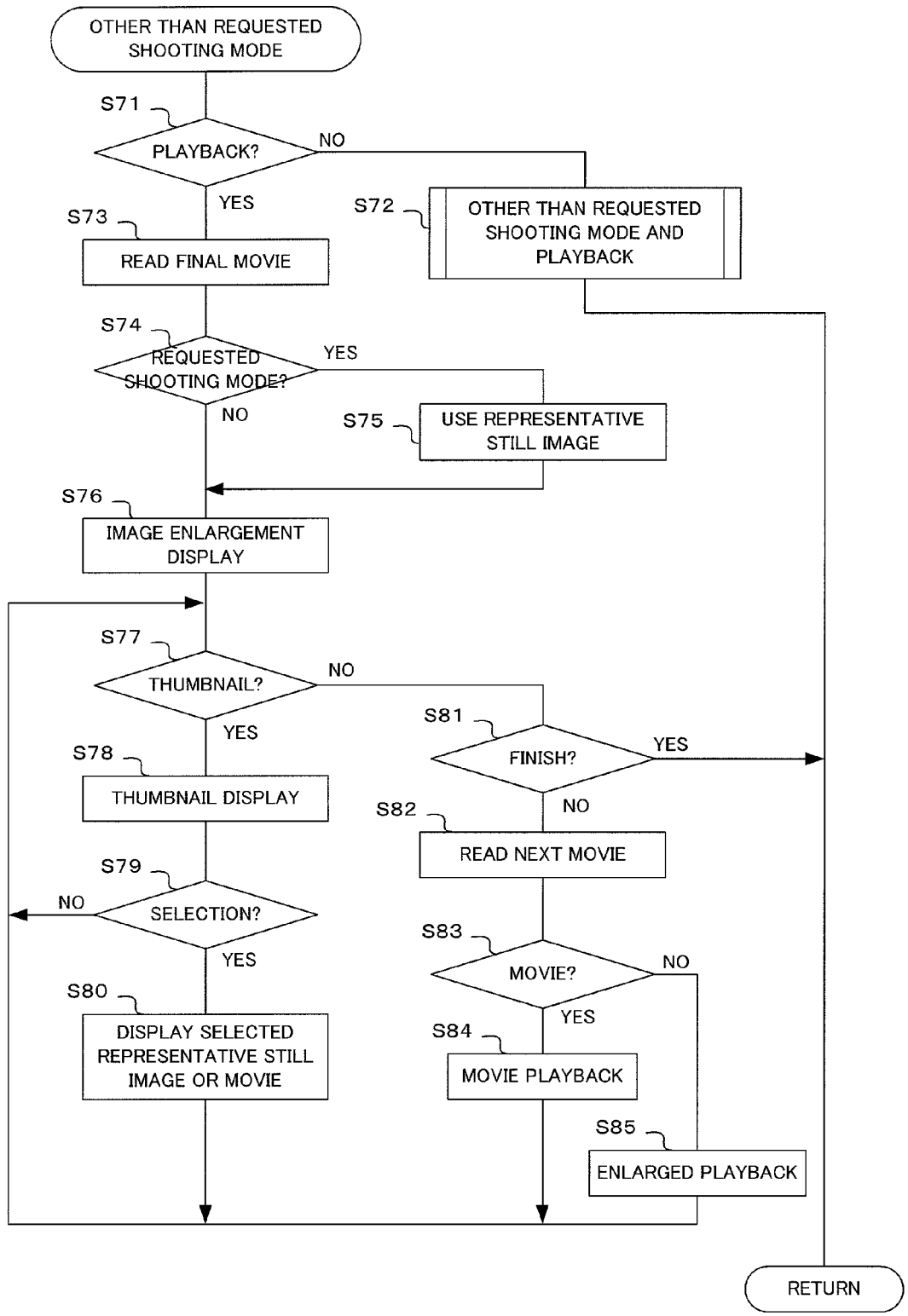
FIG. 10 is a flowchart showing operations other than for requested shooting mode, in the camera of the second embodiment of the present invention.

Next, a second embodiment of the present invention will be described using FIG. 8 to FIG. 10. In the first embodiment shooting of a movie was started when the camera 10 is in a stable state and a face exists within the screen, but in the second embodiment determination is also carried out regarding the facial expression of a person who is the subject, and actual storage of a movie is carried out based on the results of this determination.

Shooting in the "requested shooting mode" in this second embodiment will be described using FIG. 8A to FIG. 8F. FIG. 8A is a scenario where a person 21a requesting shooting makes a request to be shot with two companions 21b, 21c to a person 22. If the person 22 receiving the request holds the camera 10 (refer to FIG. 8B), the companions 21b, 21c gather close to the person 21a who made the request (refer to FIG. 8C).

Then, in shooting the movie, the person 22 requested to do the shooting holds the camera 10, shooting starts at a point in time where the person requesting the shooting 21a, etc. adopt a specified face, such a widely grinning smiley face (refer to FIG. 8D for a taken image at this time), movie shooting is carried out until the companions 21b and 21c gather round and movement stops (refer to FIG. 8E for an image taken at this time), and once movement stops trimming processing is carried out by cropping the image in order to give a transitional effect when shooting is completed (refer to FIG. 8F for an image at this time). The "specified face" is, for instance, a facial expression, inclination or pose that is consciously known to be a face that is photogenic.

This trimming processing can also be carried out at a time other than when movement stops, and can be carried out for an image when the person 22 requested to do the shooting performs a release operation (in a flowchart that will be described later processing is carried out for an image after the release operation). With this embodiment also, similarly to the first embodiment, the person 21 requesting the shooting to be done simply asks for a picture to be taken and does not need to inform the other person of anything in particular to perform movie shooting at that time. Since movie shooting starts from when the person 22 who is requested to do the shooting holds the camera, when taking a still image, it is possible to enjoy the activity of the person 21*a* requesting the shooting and the companions 21*b*, 21*c*, at the time of playback.

The structure of this embodiment for implementing the requested shooting mode in this way is substantially the same as the block diagram of FIG. 1 described in the first embodiment, and so detailed description is omitted. Camera control operations of this embodiment will be described using the flowchart shown in FIG. 9. This processing flow is executed by the control section 1 on the basis of a prestored program.

If the processing flow for camera control is entered, then similarly to step S1 it is determined whether or not it is requested shooting mode (S41), and if the result of this determination is that it is not requested shooting mode, a mode other than this is executed (S42), and once processing is complete step S41 is returned to. Processing flow for other than the requested shooting mode in step S42 will be described later using FIG. 10.

If the result of determination in step S41 is that it is requested shooting mode, the zoom is next electrically driven to wide angle, and an imaging operation, and imaging and display, are commenced (S43). In this step, the focal length of the zoom lens 2*c* is driven to the wide angle end, and an imaging operation by the imaging section 2 is commenced. By carrying out zooming of the zoom lens 2*c* to the wide angle end, the possibility of the person 21*a* requesting the shooting entering the composition is increased. Then, live view display on the display section 8 is commenced based on image signals output from the imaging section 2, and the person 22 requested to do the shooting can perform framing by looking at the display.

Next, it is determined whether or not there is device movement (S44). Since acceleration applied to the camera 10 is detected by the attitude determination section 4, in this step S44 detection of whether or not there is movement due to handing over the device (camera 10) is carried out under the conditions as shown in FIG. 8A, based on detection results such as acceleration. In this determination, it is possible to take variation in acceleration into consideration, as was described using FIG. 6, FIG. 7A and FIG. 7B. If the result of this determination is that the device is moving, then the camera 10 is not in a stable state, and so movie shooting is not commenced and step S41 is returned to.

If the result of determination in step S44 is that the device is not moving, it is next determined whether or not the camera is reliably fixed vertically (S45). Here it is determined by the attitude determination section 4 whether or not the camera 10 is in a stable state (refer to FIG. 8B).

If the result of determination in step S45 is that the camera is not reliably fixed vertically, it is next determined whether or not there is a movie C (S46). A movie C is a movie of 0.5 seconds shot in step S62, which will be described later, after representative still image shooting. If the result of this determination is that a movie C has been stored, processing returns to step S41.

On the other hand, if the result of determination is that there is not a movie C, an object image (movie A, movie B) is deleted (S47). If a movie C is stored, it is a case performed up to shooting of a representative image, while if a movie C is not stored it is before representative still image shooting. Here, a representative still image captures a specified instant, and for the photographer and for the subject, it is a highly satisfying spontaneous image, and can be thought of as having a high degree of completion and enduring appreciation. A movie up until an image with a high degree of completion is reached can be considered to often include picturesque instances that are pursuant to the representative still image, while on the other hand a movie that has no basis, such as haphazardly taken still images, has a low degree of completeness, has no appreciation, and is often a fragmented movie with no meaning. Consequently, in the case where a sequence of movies are not made up until the representative still image, these movie A and movie B are deleted. Once the object image is deleted processing returns to step S41.

If the result of determination in step S45 is that the camera is reliably fixed vertically, continuous shooting is next carried out, and a movie A at this time is temporarily stored (S48). Temporary storage, as will be described later, is in order to finally store only 0.5 seconds immediately before start of shooting of movie B.

Next, a person in the center is detected, and it is determined whether or not the position and expression of the person is a specified face, such as a smiling face (S51). In this step it is determined by the face detection section 2*a* whether or not there is a person in the center, and if there is a person it is determined whether or not the position of the person and the face at that time are a specified facial expression, such as a smiling face.

If the result of determination in step S51 is No, it is next determined whether or not there is an image A (movie A) of 0.5 seconds before (S52). If the result of this determination is that a movie A for 0.5 seconds earlier is not temporarily stored, step S41 is returned to. 0.5 seconds is an example, and it is also possible to have a shorter time or a longer time than this.

On the other hand, if the result of determination in step S52 is that a movie A 0.5 seconds earlier is temporarily stored, the object image (movie A) is deleted (S53). The movie A is a temporary image taken before movie B, which will be described later, and is a movie immediately before the person in the center adopted the specified face. This movie A is not suitable for playback over a long time, and so only 0.5 second immediately before starting shooting of movie B is stored, and the object image before that (movie A) is deleted. Once the object image is deleted processing returns to step S41.

If the result of decision in step S51 is Yes, shooting of movie B is next carried out (S55), and the shot movie is stored (S56). Here, image signals output from the imaging section 2 are subjected to image processing by the movie processing section of the image processing section 5, and image data of the processed movie is stored in the storage section 6. Since the person in the center has adopted a specified face, the movie is started from that point in time. This movie B continues up to shooting of the representative still image in step S62, which will be described later.

Next, similarly to step S51 a person in the center is detected, and it is determined whether or not the position and expression of the person is a specified face, such as a smiling face (S57). If the result of this determination is No, it is next determined whether or not there has been a release operation (S58). In this step it is determined whether or not the release button within the operation section 9 has been operated. If the result of this determination is that there has been no release operation, processing returns to step S55, and storage of movie B continues.

If the result of determination in step S58 is that there has been a release operations, or the result of determination in step S57 was Yes, the screen is next blacked out, and front surface display is carried out (S61). Once the release operation has been carried out, the photographer is freed of any stress related to shooting, and since the possibility of the camera 10 moving is high, in step S61 and after there is a transfer to control for shooting completion. Front surface display in this step is causing the intermittent lighting up of LEDs or a strobe provided on the front surface of the camera 10. The screen blackout and front display in this step are actually carried out in the next step, but this is to confirm that shooting of the still image has been completed to the person 22 who was requested to do the shooting.

The representative still image and the movie C are then stored (S62). In this embodiment, the time at which the representative still image is stored is not limited to the time of operation of the release button, and can be any time that the expression of a person in the center becomes a specified expression. In this step, image signals output from the imaging section 2 are subjected to processing by the still image processing section of the image processing section 5, and image data of this representative still image is stored in the storage section 6.

After completion of shooting of the representative still image, the movie C is stored for 0.5 seconds. For the movie C, as with movie A, image signals output from the imaging section 2 are subjected to processing by the movie processing section of the image processing section 5, and image data of this movie is stored in the storage section 6. The video recording time is made 0.5 seconds in this embodiment, but this is only an example and it can also be longer or shorter than this. Also, although the video recording time is about 0.5 seconds, at the time of playback it is also possible to have slow motion and fast forward, so it does not mean that the playback time is 0.5 seconds.

Once shooting of the representative still image and the movie C have been carried out, shooting of a movie D that has a transitional effect is carried out (S63). Here, as the movie D creating a transitional effect, there is, for example, a movie that has been subjected to trimming processing as shown in FIG. 8F. Besides this it is also possible to carry out other processing, such as fade out. The movie C and the movie D are images for video editing. Once the movie D has been shot, shooting is completed.

Next, processing flow for other than the requested shooting mode of step S42 will be described using FIG. 10. If the processing flow for other than the requested shooting mode is entered, it is first determined whether or not it is playback mode (S71). Playback mode is set by operating a playback button of the operation section 9, and so in this step it is determined whether or not the playback button has been operated. If the result of determination is that it is not playback mode, a mode other than requested shooting mode or a playback mode is carried out (S72). Once this processing is complete, the original processing flow is returned to.

If the result of determination in step S71 is that it is playback mode, a finished image is then read out (S73). Here, the most recently shot image data stored in the storage section 6 is read out. Next, it is determined whether or not the read out image data is of an image that was taken in requested shooting mode (S74).

If the result of this determination is that it is an image that was taken in requested shooting mode, the representative still image is used (S75). Specifically, the image taken in requested shooting mode is made up from movie A, movie B, representative still image, movie C and movie D, but when reading a finished image the representative still image is used. This is because the person 22 who has been requested to do the shooting is not aware that a video was taken, and will be satisfied by the display of the representative still image.

If use of the representative still image is decided in step S75, or if the result of determination in step S74 was that it was not requested shooting mode, enlarged display of the image is carried out next (S76). Here, image data read out in step S73 is displayed enlarged. In the case where shooting was carried out in requested shooting mode, the representative still image is used in step S75, and at this time the representative still image is displayed enlarged.

Next it is determined whether or not thumbnail display will be carried out (S77). At the time of playback mode, if the user has operated an operation member, such as the zoom button, thumbnail display will be carried out, and so in this step it is determined whether or not this operation member has been operated.

If the result of determination in step S77 is that the operation member for carrying out thumbnail display has been operated, thumbnail display is carried out (S78). Here, an image stored in the storage section 6 is read out, and subjected to thumbnail display. In this case, for an image that was taken in requested shooting mode the representative still image is used in step S75, and so thumbnail image data based on the representative still image is read out and subjected to thumbnail display.

Once thumbnail display has been carried out, it is determined whether or not a thumbnail image has been selected (S79). In selecting an image from among images that are being thumbnail displayed, a cursor is moved using a cross key button, and selection is confirmed by pressing the OK button, and so in this step it is determined whether or not an image has been selected using the OK button.

If the result of determination in step S79 is that an image has not been selected processing returns to step S77. On the other hand, if the result of determination is that an image has been selected then display of an enlargement of a selected still image or a movie is carried out (S80). Here, in the event that a selected image is a still image, image data for that still image is read out from the storage section 6 and subjected to enlarged display. Also, if the selected image is a movie, image data for that movie is read from the storage section 6 and movie playback is carried out. In the case where an image was taken in requested shooting mode, image data for the movie and a representative still image are stored, but in this step the movie is played back. Once playback of the still image or the movie has been carried out, processing returns to step S77.

If the result of determination in step S77 is that the operation member for carrying out thumbnail display has not been operated, it is next determined whether or not processing is to be terminated (S81). If playback display is terminated, the user will operate an operation member such as the playback button, and so in this step it is determined whether or not a termination operation has been performed. If the result of this determination is that a termination operation has been performed, playback mode is terminated and the original processing flow is returned to.

If the result of determination in step S81 is that there has not been a termination operation, it is determined whether or not to read out the next image (S82). Here it is determined whether or not an operation to step forward or backward by one frame using operation of the cross key button or the like has been carried out, and image data for the next image is read out from the storage section 6 depending on the result of this determination.

Once the next image has been read out, it is determined whether or not the read image is a movie (S83). Here, it is determined whether the read image data is still image data or movie image data. If the result of determination is that it is a movie, movie playback is carried out (S84). Here, image processing for playback is carried out by the movie processing section of the image processing section 5, and the movie is displayed on the display section 8.

Also, if the result of determination in step S83 is that it is a still image, enlarged playback is carried out (S85). Here, image processing for playback is carried out by the still image processing section of the image processing section 5, and the still image is displayed enlarged on the display section 8. Once movie playback or enlarged playback has been carried out, processing returns to step S77.

As has been described above, in the second embodiment shooting of a movie B is started in accordance with determination results from the attitude determination section 4 of the camera 10, and determination results for the camera 10 being grasped firmly and expression of a person in the center. It is therefore possible for a person 22 who has been asked to carry out shooting to shoot a movie in a casual manner without worrying about when to start shooting, simply by holding the camera 10, and furthermore, to start shooting at a point in time when a person's expression is good.

Also in this embodiment, movie A is temporarily stored before storage using movie B. It is therefore possible to enjoy variation from immediately before a specified face up to a specified face appearing. Further, in this embodiment movie C is stored after storage using movie B. It is therefore possible to enjoy variation in expression where there is a release of tension after the release operation. Further, since a movie D creating a transitional effect is shot, there is no unnatural image with the image suddenly ending, at the time of movie playback.

In this embodiment, with the determination of step S57, a still image is also shot in a case where person in the center has a specified face, but it is possible to omit this step and only shoot a still image at the time of a release operation. Also, in this embodiment, shooting is carried out in the order movie A→movie B→still image→movie C→movie D, but obviously any of movie A, movie C or movie D can be omitted.

Next, a third embodiment of the present invention will be described using FIG. 11A to FIG. 18B. In the first and second embodiments, there was requested shooting mode, where a person 21 requesting shooting handed the camera 10 to another person 22, and requested that they take a picture. The third embodiment has a child mode where by giving the camera to a child, the child automatically takes their own picture.

Figure 11A:
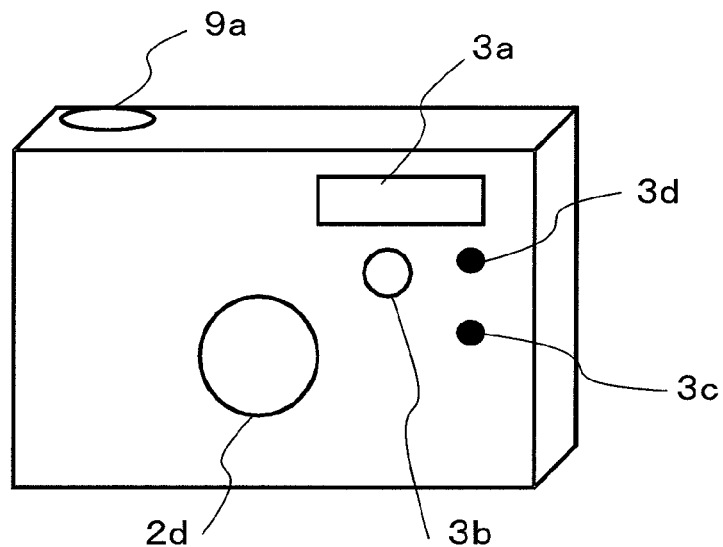
FIG. 11A to FIG. 11C are drawings showing the external appearance of a camera of a third embodiment of the present invention, FIG. 11A being an external perspective view looking from the front, FIG. 11B being an external perspective view looking from the back, and FIG. 11C showing display timing performed randomly at the time of child mode setting.
Figure 11B:
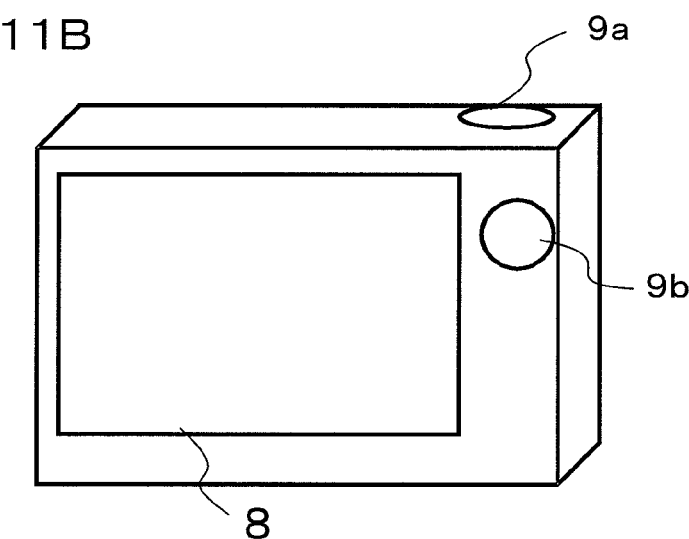

A camera capable of setting the child mode of this third embodiment will be described using FIG. 11A to FIG. 11C. FIG. 11A and FIG. 11B are external perspective drawings showing the external appearance of a camera 10 of this embodiment, with FIG. 11A being an external perspective view looking from the front, and FIG. 11B being an external perspective view looking from the back.

A photographing lens 2d is arranged on the front of the camera 10, instead of the zoom lens 2c. This photographing lens 2d is constructed from a zoom lens having a variable focal length. Above and to the left of the photographing lens, a light emitting diode (LED) 3b constituting the alert section 3 is provided, and above this there is a strobe 3a further constituting the alert section 3.

Figure 11C:

When child mode has been set, the LED 3b emits light in a random display pattern, such as shown in FIG. 11C, in order to attract the child's attention. Also, the strobe 3a irradiates illuminating light when the subject is of low brightness, but in addition to this function, when child mode has been set the strobe 3a emits light in an illuminating pattern similar to that of FIG. 11C, in order to attract the child's attention.

Also, a speaker 3c is arranged at the right side on the front of the camera 10, and this speaker 3c also functions as the alert section 3. A microphone 3d is arranged above this speaker 3c. At the time of movie shooting, the microphone 3d collects sound and converts into audio signals in order to record ambient sound. At the time of movie playback, the speaker 3c reproduces the ambient sound recorded at the time of shooting, or, when child mode has been set, emits an audio pattern that resembles that of FIG. 11C, in order to attract the child's attention.

A release button 9a, constituting the operation section 9, is arranged on an upper surface of the camera 10. Also, a display surface of a display section 8 is arranged on the rear surface of the camera 10, as shown in FIG. 11B. This display section 8 performs live view display and playback display, etc., similarly to the first embodiment. To the right side of the display section 8, a mode setting button 9b is arranged, and it is possible to set shooting modes such as child mode with this mode setting button 9b. "Child Mode" is a mode in which if a child is given the camera, when the child's attention has been attracted and the photographing lens 2d is being pointed towards the child, shooting is carried out automatically.

The electrical structure of this embodiment is substantially the same as the block diagram of FIG. 1 describing the first embodiment, but the alert section 3, display alert control section 1b and mode setting section 1c are slightly different. The alert section 3 of this embodiment includes the previously described strobe 3a, LED 3b and the speaker 3c, and when child mode has been set it emits sound and light so as to attract the attention of the child, based on control signals from the display alert control section 1b. The mode setting section 1c can also carry out setting of child mode. The remaining structure is substantially the same as the block diagram of FIG. 1, and so detailed description is emitted.

Next, shooting in the child mode of this embodiment will be described using FIG. 12A to FIG. 12D. Here, an example is shown where, together with setting to child mode by operating the mode setting button 9b, a child 31 is given the camera 10 to play with, and the child 31 is caused to take a movie of themselves.

First, if child mode has been set, a photograph 35 (refer to FIG. 12A) showing a child 31 of about 2 or 3 years old and the child's mother 32 (refer to FIG. 12A) is playback displayed on the display section 8 of the camera 10. With the photograph 35 displayed on the display section 8 of the camera 10, the father 33 hands the camera 10 to the child 31 while the child 31 is looking at this photograph 35. If the child takes the camera 10, the likelihood of the camera holding their interest and the child 31 playing with it is high. At this time, if the strobe 3a and LED 3b of the camera 10 emit light, and the speaker 3c emits sound, the child 31 will be curious and play with it, wanting to know what the camera 10 is and turning it around.

At some point while the child 31 is turning the camera 10 around, the photographing lens 2d will be facing the child 31.

Figure 12A:
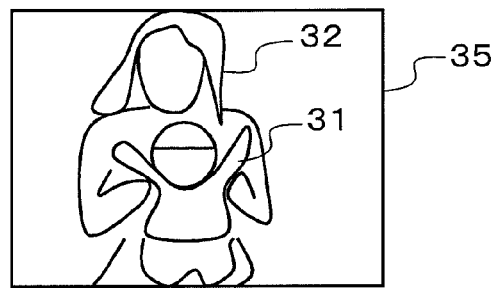
FIG. 12A to FIG. 12D are drawings showing a usage method for the camera of the third embodiment of the present invention, and show appearance of the camera being handed over to a child and the child taking a picture of themselves.
Figure 12B:
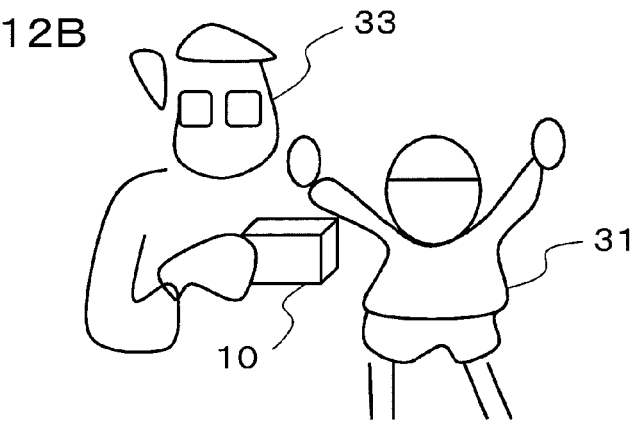
Figure 12C:
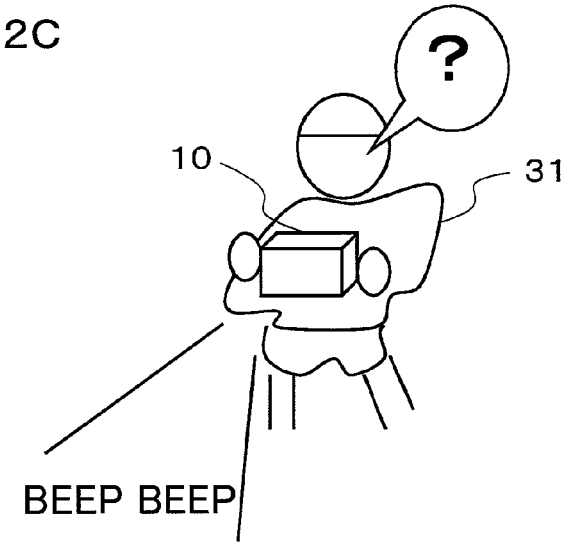
Figure 12D:
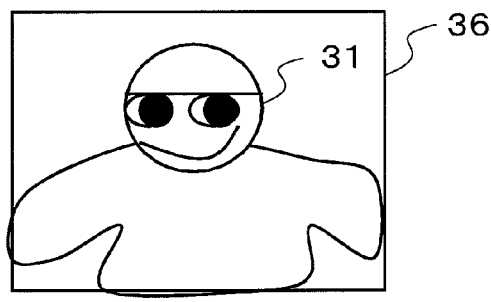

If the camera 10 starts shooting a movie at this time, it is possible to shoot a movie 36 such as is shown in FIG. 12D. The image at this time records the child's interest being held by the camera 10, and will come to hold many memories for the parents. Also, when the photographing lens 2d is facing the child 31 while the child 31 is playing, since video shooting commences automatically it is possible to shoot a movie without anyone feeling any stress.

Figure 13:
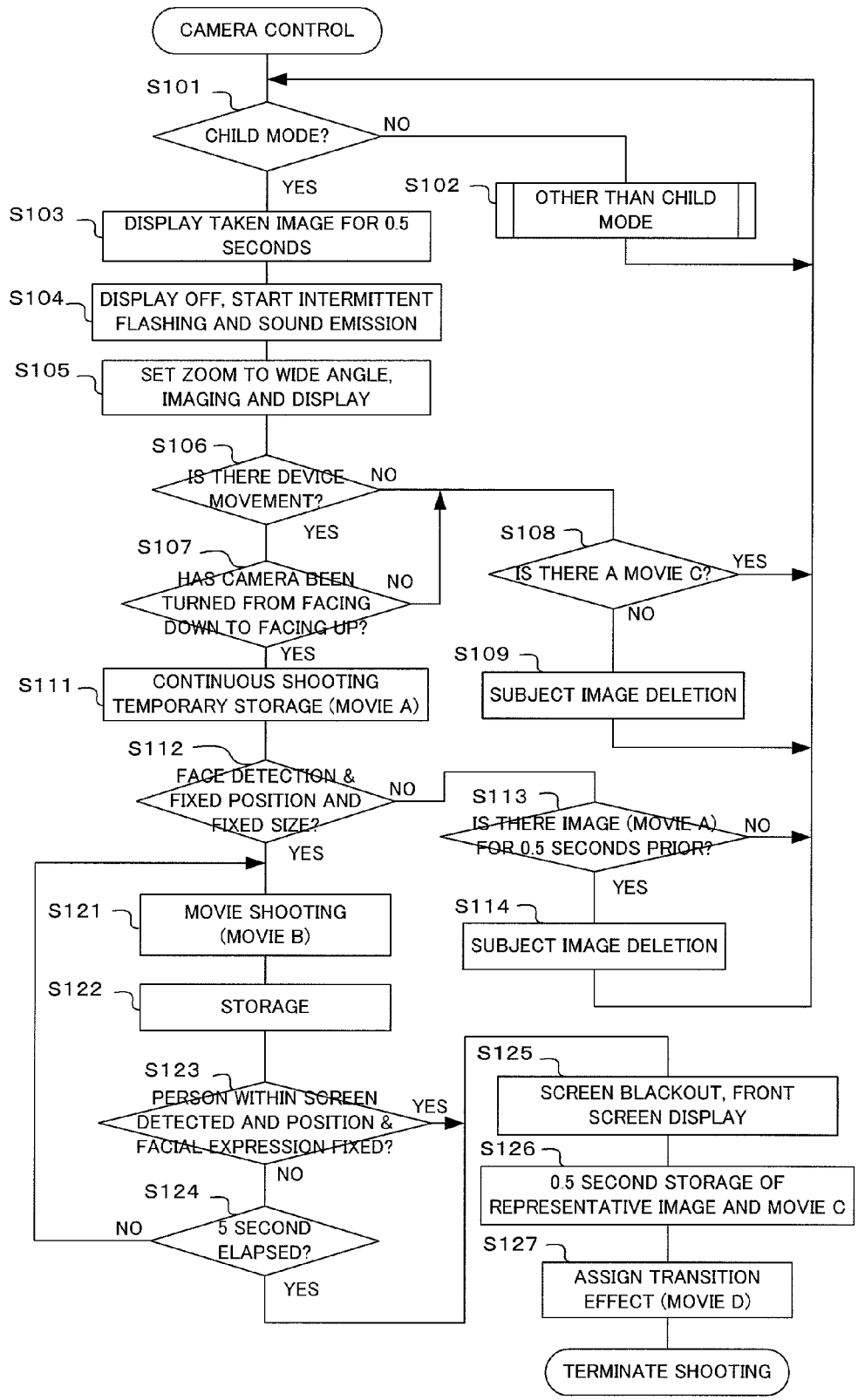
FIG. 13 is a flowchart showing camera control operations for the camera of the third embodiment of the present invention.

Next, a shooting operation for this type of child mode will be described using the camera control flowchart shown in FIG. 13. This processing flow is executed by the control section 1 on the basis of a prestored program.

If the processing flow for camera control is entered, it is first determined whether or not the child mode has been set (S101). Child mode is set using the mode setting button 9b, and so in this step determination is made based on the operational state of the mode setting button 9b. If the result of this determination is that child mode has not been set, a mode other than child mode is executed (S102). Here, it is determined whether one of various shooting modes or playback mode, other than the child mode, is set, and processing is carried out based on the result of this determination. Once a mode other than child mode has been executed, processing returns to step S101.

If the result of determination in step S101 is that child mode has been set, a taken image is displayed for 5 seconds (S103). Here, the photograph 35 such as shown in FIG. 12A is displayed on the display section 8. At this time the father 33 or the like can hand the camera 10 to the child 31 etc. 5 seconds is merely an example, and it is also possible to be longer or shorter, as long as it is sufficiently long for the child 31 to see.

Once display of the taken image has been carried out, the display is turned off, and sound emission starts, together with intermittent emission of light (S104). Here, the photograph 35 on the display section 8 is deleted, intermittent light emission in a pattern such as shown in FIG. 12C is carried out using the LED 3b, and sound emission with a similar pattern is similarly carried out using the speaker 3c. In this way there is a high possibility of the child 31 etc. being interested by what is going on, and looking at the camera 10 while turning it around. In this embodiment both light emission and sound emission are carried out, but it is also possible to have either one, or to attract the interest of the child 31 etc. by some other method.

Next, zoom is set to wide angle, and imaging and display are carried out (S105). Here, the photographing lens 2d is driven to the wide angle end by power zoom, image signals are obtained from the imaging section 2, and live view display is carried out on the display section 8. By setting the focal length to the wide-angle end, the child 31 etc., can be caught as the subject image. The child 31 etc. is at the stage where they would play with the camera 10 while turning it around, which means that live view display on the display section 8 can be turned off.

Once the camera has been zoomed to wide angle and imaging commenced, it is determined whether or not the device is moving (S106). Whether or not there is movement due to handing over the device (camera 10) from the father 33 to the child 31 etc., as shown in FIG. 12B, is determined based on detection results such as acceleration from the attitude determination section 4.

If the result of determination in step S106 is that the device is moving, that is, that there has been handing over of the camera 10 from the father or the like to the child 31 etc., it is next determined whether or not the camera has changed from pointing downwards to pointing upwards (S107). Here, it is determined by the attitude determination section 4 whether or not the camera 10 has gone from facing downwards to facing upwards, namely, is the photographing lens 2d facing in the direction of the child 31 etc.

If the result of determination in step S107 is that the camera 10 has not changed from facing downwards to facing upwards, or if the result of determination in step S106 is that the device is not moving, it is next determined whether or not there is a movie C (S108). Similarly to the second embodiment, the movie C is a movie that was shot after shooting of a representative still image, and in this step it is detected whether or not the movie C has been shot. If the result of this determination is that there is a movie C, processing returns to step S101.

On the other hand, if the result of determination in S108 is that there is not a movie C, an object image (movie A, movie B) is then deleted (S109). If a movie C is stored, it is a case performed up to shooting of a representative image, while if a movie C is not stored it is before representative still image shooting. It is desirable for these movies to be a sequence of taken movies up until the representative still image, and so if the result of determination is that there is no movie C, the movie A and movie B are deleted. Once the object image is deleted processing returns to step S101.

If the result of determination in step S107 is that the camera 10 has changed from facing downwards to facing upwards, a sequence of shots (movie A) is temporarily stored (S111). Since the camera 10 has changed from facing downwards to facing upwards, there is a high possibility that the child 31 etc. will be pointing the photographing lens 2d in the direction of their own face, and so temporary storage of movie A is commenced.

Once temporary storage of movie A has commenced, it is next determined whether or not there is face detection, and if a face is at a specified position, and whether or not the face is a specified size (S112). Here, it is determined by the face detection section 2a whether or not the position of the face is substantially in the center of the screen, and whether or not the size of the face is the size it would be at a distance where the child 31 is holding the camera 10 in their hands. It is possible to calculate the size of the face and the hand length based on general child sizes.

If the result of determination in step S112 is No, then similarly to step S52 it is determined whether or not there is an image (movie A) for 0.5 seconds before (S113). If the result of this determination is that a movie A for 0.5 seconds earlier is not temporarily stored, step S101 is returned to. 0.5 seconds is an example, and it is also possible to have shorter time or a longer time than this.

On the other hand, if the result of determination in step S113 is that a movie A 0.5 seconds earlier is temporarily stored, the object image (movie A) is deleted (S114). The movie A is a temporary image taken before movie B, and is a movie immediately before the child 31 etc. points the camera 10 towards their own face. This movie A is not suitable for playback over a long time, and so only 0.5 seconds immediately before starting shooting of movie B is stored, and the object image before that (movie A) is deleted. Once the object image is deleted processing returns to step S101.

If the result of face detection is that a face is at a specified position and is a specified size, shooting of movie B is next carried out (S121), and movie B is stored (S122). Here, image signals output from the imaging section 2 are subjected to image processing by the movie processing section of the image processing section 5, and image data of the processed movie is stored in the storage section 6. If the result of determination in S112 is Yes, the photographing lens 2d of the camera 10 is facing the child 31 etc., and so a movie is started at this point in time. This movie B continues up to shooting of the representative still image in step S126, which will be described later.

Once storage of the shooting of movie B has started, detection of a person within the screen is carried out, the position of that person is detected, and it is determined whether or not their expression is a specified expression, such as a smiling face (S123). Here the position of a face of a child 31 etc. is detected by the face detection section 2a, and the expression determination section 2b determines whether or not the facial expression of the child 31 etc. is a specified face such as a smiling face. In the second embodiment, a person 21 requesting a picture to be taken, who would also be the photographic subject, is assumed to be an adult, but in the third embodiment a child 31 etc. is assumed to be the photographic subject, and so in the photographic subject a cute expression etc. appropriate to a child is made a specified face.

If the result of determination in step S123 is No, then it is next determined whether or not 5 seconds have elapsed from the start of shooting movie B (S124). If the result of this determination is that 5 seconds have not elapsed, processing returns to step S121. Accordingly, also in the case where there is not a specified face, such as a cute smiling face, for 5 seconds movie B is stored as it is. 5 seconds is just an example, and in a case where there is not a specified face for a long time a person watching may become bored, and so it is possible to be a time such that people do not become bored.

If the result of determination in step S123 is Yes, or if the result of determination in step S124 is that 5 seconds have elapsed, after that a representative still image is taken, and finishing processing for the shoot is carried out. First, similarly to step S61, the screen is blacked out and front display is carried out (S125). With blackout, the entire screen of the display section 8 is put in total darkness, and with front display the strobe 3a and the LED 3b intermittently emit light. In this way it will be understood that shooting of the still image is completed.

Similarly to step S62, the representative still image and the movie C are then stored (S126). In this step, image signals output from the imaging section 2 are subjected to processing by the still image processing section of the image processing section 5, and image data of this representative still image is stored in the storage section 6. Also, after completion of shooting of the representative still image, movie C is stored for 0.5 seconds. For the movie C, as with movie A, image signals output from the imaging section 2 are subjected to processing by the movie processing section of the image processing section 5, and image data of this movie is stored in the storage section 6. The video recording time for movie C is made 0.5 seconds in this embodiment, but this is only an example and it can also be longer or shorter than this. Also, although the video recording time is about 0.5 seconds, at the time of playback it is also possible to have slow motion and fast forward, so it does not mean that the playback time is 0.5 seconds.

Once shooting of the representative image and the movie C are carried out, next, similarly to step S63, movie D that creates a transitional effect is shot (S127). Here, as the movie D creating a transitional effect, there is, for example, a movie that has been subjected to trimming processing as shown in FIG. 8F, or a movie that has been subjected to fade out processing. The movie C and the movie D are images for video editing. Once the movie D has been shot, shooting is completed.

Figure 14:
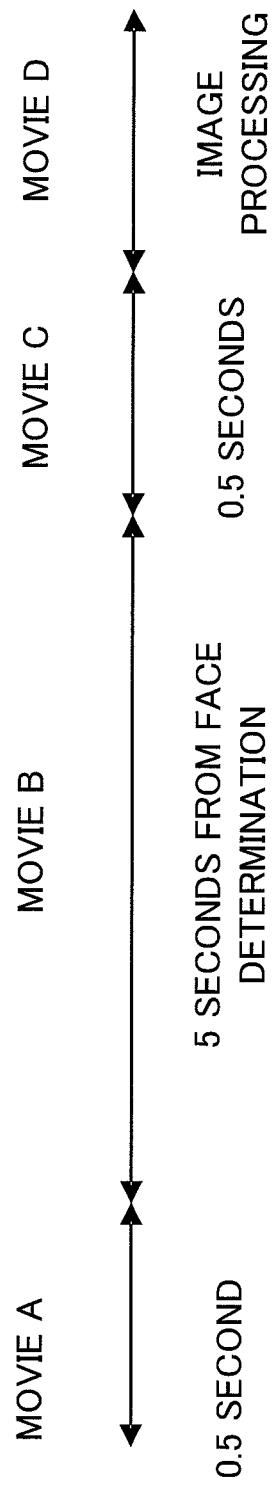
FIG. 14 shows a relationship between shooting timing and shooting content for a movie, in the camera of the third embodiment of the present invention.

In this manner, with this embodiment, in the case where child mode has been set in the camera 10, if the photographing lens 2d of the camera 10 is facing the child 31 etc. then first, as shown in FIG. 14, movie A is shot for 0.5 seconds, and if face determination is OK movie B is shot from that point in time for 5 seconds (or up to that point in time if there is no specified face), and after that a representative image is shot. Then movie C is shot for 0.5 seconds, and finally movie D that has been subjected to image processing is shot. The main part of movie shooting for a child 31 or the like is movie B, but before and after movie B, movie A and movie C are shot to give leeway, and further, finally, a feeling of completion of the movie is imparted using movie D that has been subjected to image processing.

Next, in this embodiment, a modified example of display in order to cause a child 31 etc. to move the camera 10, so that the photographing lens 2d is facing the child 31, will be described using FIG. 15A to FIG. 18B. In this modified example, the child is easily encouraged to move the camera 10 by introducing variation into the images displayed on the display section 8.

Figure 15A:
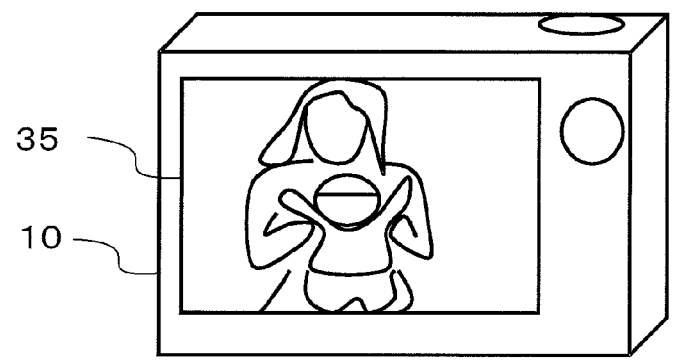
FIG. 15A to 15D are drawings showing the appearance of getting a child interested and then taking a picture, with a modified example of the camera of the third embodiment of the present invention.
Figure 15B:
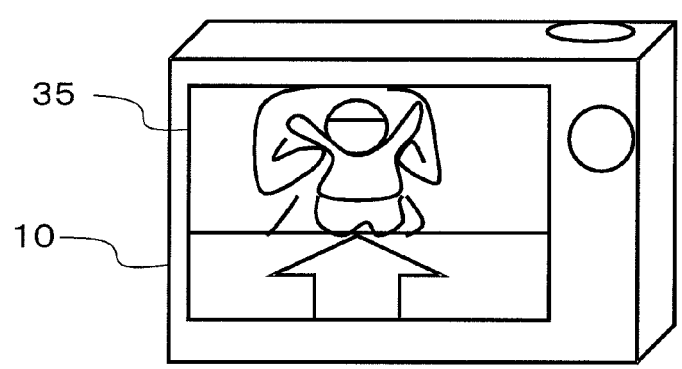
Figure 15C:
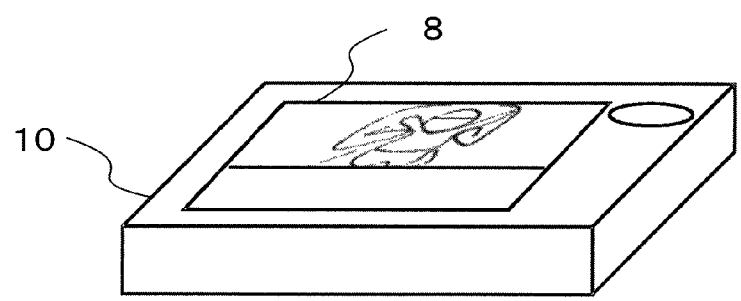
Figure 15D:
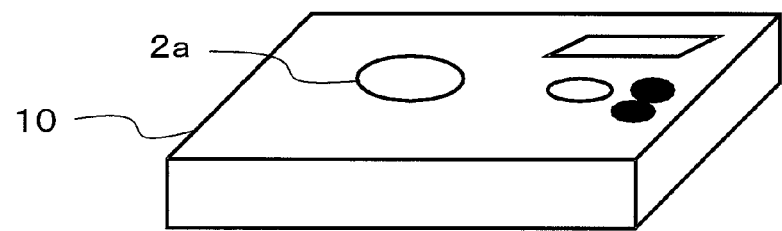

FIG. 15A to FIG. 15D are drawings for describing a display method of this modified example, with FIG. 15A showing the appearance when a photograph 35 is being displayed on the display section 8 of the camera 10. As shown in FIG. 15B, from this state the photograph is shifted so that it appears to slide upwards. As shown in FIG. 15C, the camera 10 has the display section 8 facing upwards, in other words, the photographing lens 2d is facing downwards. In this state, as shown in FIG. 15B, if the photograph 35 shifts upwards the child 31 etc. will be mystified as to what is above, and turn the camera 10, so that the photographing lens 2d is then facing upwards, as shown in FIG. 15D. If this state is arrived at, shooting of the movie can be started.

FIG. 16A is a modified example of the photograph 35 on the display section 8 shown as an example in FIG. 15A to FIG. 15D. With this modified example, a photograph 37 is subjected to image processing so that it appears to be cylindrical. Specifically, the screen of the display section 8 is flat, but by carrying out image processing so that the photograph 35 appears to be the same as when it is fixed to the surface of a cylinder, the photograph 37 is obtained. Then, when the camera 10 has been handed to the child 31, together with display of the photograph 37 on the display section 8, the photograph 37 is subjected to rotational display so that it appears as if a cylinder is rotating, as shown in FIG. 16B. In this way, the interest of the child 31 etc. is piqued and they will move the camera 10 around for a while, and there is a high possibility of the photographing lens 2d facing in the direction of the child 31 themselves.

Figure 17:
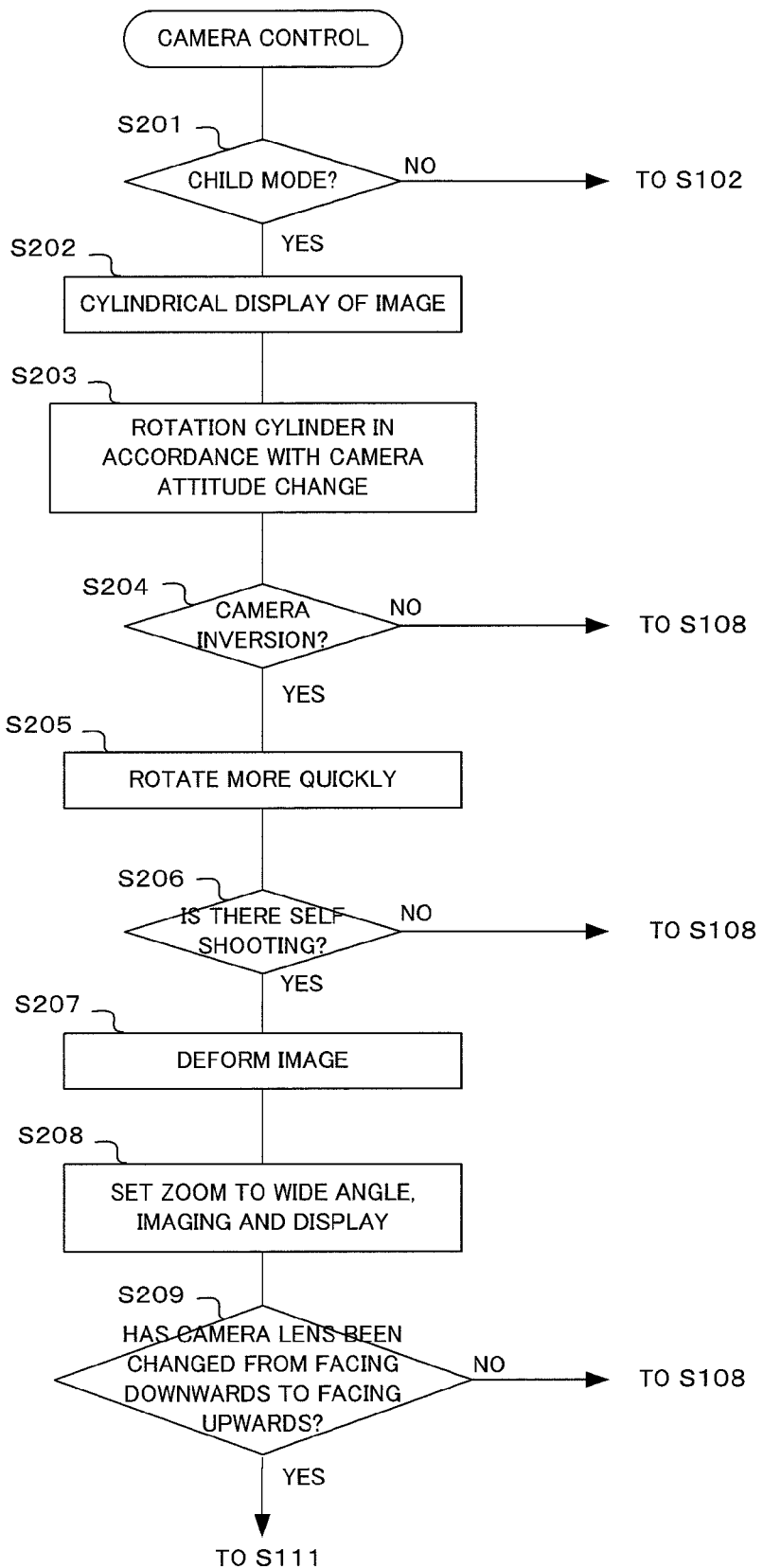
FIG. 17 is a flowchart showing camera control operations for a camera of a fourth embodiment of the present invention.

Next, operation of this embodiment will be described using the flowchart for camera control shown in FIG. 17. This flowchart has parts corresponding to from step S101 to step S107 in the camera control flowchart of the third embodiment shown in FIG. 13 replaced with S201 to S209, and other parts are the same as the flowchart shown in FIG. 13, and so are omitted from the drawing.

If the processing flow for camera control is entered, then similarly to step S101 it is first determined whether or not the child mode has been set (S201). If the result of this determination is that it is not child mode, the program advances to processing flow for other than child mode in step S102. On the other hand, if child mode has been set, an image is displayed cylindrically (S202). Here, as shown in FIGS. 16A, 16B and 18A, the photograph 37 that has been subjected to image processing so that it appears to be cylindrical is displayed.

Next, cylinder rotation is carried out depending on the attitude of the camera (S203). Here change in attitude of the camera 10 is detected by the attitude determination section 4, and the image is rotated to appear cylindrical in accordance with the detection results. Specifically, in the case where the camera 10 rotating around a direction orthogonal to the longitudinal direction of the camera 10 is detected, the photograph 37 is also rotated in this direction, as shown in FIG. 183. The speed of rotating the photograph 37 also depends on the speed of rotating the camera 10.

It is next determined whether or not the camera has been turned over (S204). Here it is determined by the attitude determination section 4 whether or not the camera 10 has been turned over so that display section 8 of the camera 10 changes from facing to the child side to the opposite side. If the result of this determination is that the camera has not been turned over, processing advances to previously described step S108 (refer to FIG. 13). On the other hand, if the camera has been turned over, the rotation is made faster (S205). The rotation speed increases and the child 31 etc. becomes more and more mystified, which should make the child turn the camera 10 around.

Next it is determined whether or not self-shooting is performed (S206). Here image analysis is carried out by the face detection section 2*a* and the image processing section 5, and it is determined whether or not the photographing lens 2*d* of the camera 10 is facing in the direction of the child 31 etc., and a condition for self shooting has been attained. If the result of this determination is that it is not self-shooting, processing advances to step S108 (refer to FIG. 13). On the other hand, if it is self-shooting, the image is subjected to deformation (S207). In this state, the child 31 etc. is twirling the camera 10 around, but the image is subjected to deformation by the image processing section 5 so as to further increase curiosity. As shown in FIG. 18B, it is also possible to combine other images, such as blending into an image at the time of taking pictures of oneself.

Once deformation of the image has been carried out, then similarly to step S105 the camera is zoomed to wide angle, and imaging and display are carried out (S208). In this way, since the viewing angle is made wide it is easy for the child 31 etc. to enter into the scene. Then, similarly to step S107, it is determined whether or not the photographing lens 2*d* of the camera 10 has changed from facing downwards to facing upwards (S209). Here, determination is carried out based on the detection result by the attitude determination section 4. If the result of this determination is that there is no change in orientation, processing advances to step S108. On the other hand, if the result of this determination is that there is a change in orientation, processing advances to previously described step S111.

With this type of modified example, display on the display section 8 is varied as if the image were moving, in response to movement of the camera 10, so the child 31 etc. will move the camera 10 around, and there is a high possibility that the photographing lens 2*d* will face in the direction of the child 31. Also, since the display on the display section 8 is subjected to image processing so that it appears cylindrical, it becomes a more realistic image resulting in a high possibility that the child 31 etc. will move the camera 10 around, and face it towards themselves.

As described above, in each of the embodiments of the present invention, attitude of the camera is detected by the attitude determination section 4, and a face image is detected, and based on these detection results start of recording a movie is decided. It is therefore possible to carry out shooting without worrying about when to start and end recording of the movie. It is also possible for the photographer to enjoy shooting with the same type of feeling as when taking a still image, without feeling the stress of movie shooting, and it is possible to enjoy shooting images even if there is no intention to perform shooting.

Further, when requested shooting mode is set, by simply holding the camera with the camera facing the subject, and if a face is positioned in the screen, it is possible to start shooting a video. Further, when child mode is set, it is possible to start shooting a video as long as the camera is facing a child or the like, and a face is positioned in the screen.

With each of the embodiments of the present invention, together with recording a video, a still image is taken at a specified time, and stored, but the shooting of the still image can be omitted. When requested shooting mode is set, if shooting of the still image is omitted a fake shutter sound may be emitted, and screen blackout etc. carried out. In order to prevent the person who has been requested to carry out the shooting think they are unable to finish shooting.

Also, in each of the embodiments of the present invention, a zoom lens is provided as the photographing lens, and in the case where requested shooting mode or child mode has been set zooming is performed to the wide angle end, but since there will be cases where the user wants to perform shooting at a desired focal length it is also possible to perform shooting at the set focal length.

Also, with each of the embodiments of the present invention, description has been given using a using a digital camera as an apparatus for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, it is possible to adopt the present invention as long as a device is capable of shooting movies.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   a photographing lens for forming a subject image;
   an imaging section for converting the subject image to image signals and outputting the image signals;
   a storage section for storing image data obtained based on the image signals output from the imaging section;
   an attitude detection section for detecting an attitude of the imaging device;
   an image detection section for detecting a face image contained in the image signals;
   a storage control section for determining storage start and storage end for the image data, based on detection results of the attitude detection section and detection results of the image detection section, the storage control section determines storage start and storage end for the image data based whether or not output of both the attitude detection section and the image detection section are stable for a specified time; and
   a setting section capable of setting a requested shooting mode for requesting another person to shoot, wherein if the requested shooting mode has been set, the storage control section determines storage start and storage end for the image data, based on detection results of the attitude detection section and detection results of the image detection section, and wherein the photographing lens is a zoom lens, and has a field of view control section for automatically moving the viewing angle of the zoom lens to a wide angle end before detection of the face images by the image detection section.

2. The imaging device of claim 1, wherein:
the image detection section is capable of determining expressions of the face image, and the storage control section determines storage start and storage end for the image data based determination results for expressions of the face images, in addition to detection results of the attitude detection section and detection results of the image detection section.

3. The imaging device of claim 1, wherein:
the storage control section, before the storage start, temporarily stores the image data, and stores the most recently stored temporarily stored data if storage start for the image data is determined.

4. The imaging device of claim 1, wherein:
the storage control section, when there is a release operation, or when it has been determined that an expression of the face image is a specified face, stores image data of a still image, and then displays the stored still image data.

5. The imaging device of claim 1, further comprising:
a setting section capable of setting a child mode, where the imaging device is passed to another person, and the other person is caused to take a picture of himself or herself, wherein
if the child mode has been set, the storage control section determines storage start and storage end for the image data, based on detection results of the attitude detection section and detection results of the image detection section.

6. The imaging device of claim 1 further comprising:
an operation section for receiving manual user input,
wherein the storage control section determines storage start for the image data automatically, before a shutter release operation is received from the operation section.

7. An imaging device, comprising:
a photographic zoom lens;
an imaging section for converting a subject image formed by the zoom lens to image signals and outputting the image signals;
a storage section for storing image data based on image signals output from the imaging section;
an attitude detection section for detecting an attitude of the imaging device;
an image detection section for detecting a face image contained in the image signals;
a storage control section for controlling storage of the image data, based on detection results of the attitude detection section and detection results of the image detection section, the storage control section determines storage start and storage end for the image data based whether or not output of both the attitude detection section and the image detection section are stable for a specified time; and
a setting section capable of setting a requested shooting mode for requesting another person to shoot, wherein if the requested shooting mode has been set, the storage control section determines storage start and storage end for the image data, based on detection results of the attitude detection section and detection results of the image detection section, and wherein the photographing lens is a zoom lens, and has a field of view control section for automatically moving the viewing angle of the zoom lens to a wide angle end before detection of the face images by the image detection section.

8. The imaging device of claim 7, wherein:
the storage control section carries out storage control for image data of a movie based on the image signals, and determines storage start and storage end for the image data based on detection results of the attitude detection section and detection results of the image detection section.

9. The imaging device of claim 7, further comprising:
a release switch, and wherein
at the time of operation of the release switch, the storage control section stores image data for a still image based on image signals from the imaging section, and when there is not an operation of the release switch stores image data for a movie based on image signals from the imaging section.

10. The imaging device of claim 7, further comprising:
a moving state detection section for detecting a moving state of the imaging device, wherein
the storage control section starts storage of the image data when it has been detected by the moving state detection section that there is not a moving state.

11. The imaging device of claim 7, further comprising:
an alert section at the zoom lens side, wherein
when storage of the image data has started, an operating state is entered while causing the alert section to change so that the storage is continued.

12. The imaging device of claim 7 further comprising:
an operation section for receiving manual user input,
wherein the storage control section determines storage start for the image data automatically, before a shutter release operation is received from the operation section.

13. An imaging device, comprising:
a photographing lens for forming a subject image;
an imaging section for converting a subject image formed by the zoom lens to image signals;
a storage section for storing image data based on the image signals;
an attitude detection section for detecting an attitude of the imaging device;
an image detection section for detecting a face image contained in the image signals;
a display section provided on an outer surface different to that of the photographing lens; and
a storage control section for carrying out display to encourage an attitude change of the imaging device on the display section, and detecting a face image contained in the image signals to control start of storage of the image data, the storage control section determines storage start and storage end for the image data based whether or not output of both the attitude detection section and the image detection section are stable for a specified time; and
a setting section capable of setting a requested shooting mode for requesting another person to shoot, wherein if the requested shooting mode has been set, the storage control section determines storage start and storage end for the image data, based on detection results of the attitude detection section and detection results of the image detection section, and wherein the photographing lens is a zoom lens, and has a field of view control section for automatically moving the viewing angle of the zoom lens to a wide angle end before detection of the face images by the image detection section.

14. The imaging device of claim 13 further comprising:
an operation section for receiving manual user input,
wherein the storage control section determines storage start for the image data automatically, before a shutter release operation is received from the operation section.

15. A control method for an imaging device, comprising the steps of:
converting a subject image formed by a photographing lens to image signals;
detecting an attitude of the imaging device and detecting a face image contained in the image signals;
determining storage start and storage end for the image data, based on whether or not output of both detection results of the attitude detection and detection results of the face image detection are stable for a specified time;
storing image data obtained based on the image signals during the determined period;
setting a requested shooting mode for requesting another person to shoot, wherein if the requested shooting mode has been set, storage start and storage end for the image data are determined based on detection results of the attitude detection and detection results of the image detection; and
automatically moving a viewing angle of a zoom lens of the imaging device to a wide angle end before detection of the face images.

\* \* \* \* \*